US007974155B2

(12) United States Patent
Matsuzaki

(10) Patent No.: US 7,974,155 B2
(45) Date of Patent: Jul. 5, 2011

(54) SATELLITE SIGNAL RECEPTION DEVICE, TIMEKEEPING DEVICE WITH A SATELLITE SIGNAL RECEPTION DEVICE, AND SATELLITE SIGNAL RECEPTION METHOD

(75) Inventor: Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 564 days.

(21) Appl. No.: 12/133,191

(22) Filed: Jun. 4, 2008

(65) Prior Publication Data

US 2009/0315763 A1 Dec. 24, 2009

(30) Foreign Application Priority Data

Jul. 9, 2007 (JP) ................................ 2007-179925
Feb. 21, 2008 (JP) ................................ 2008-039753

(51) Int. Cl.
*G04C 11/02* (2006.01)
*G01S 19/30* (2010.01)
*G01S 19/34* (2010.01)

(52) U.S. Cl. ................ 368/47; 342/357.69; 342/357.74

(58) Field of Classification Search .................. 368/47; 342/357.39, 357.63, 357.68, 357.74, 357.6, 342/357.749; 375/150
See application file for complete search history.

(56) References Cited

U.S. PATENT DOCUMENTS

| | | | | |
|---|---|---|---|---|
| 5,724,046 | A * | 3/1998 | Martin et al. | 342/357.69 |
| 6,212,133 | B1 * | 4/2001 | McCoy et al. | 368/9 |
| 7,376,051 | B2 * | 5/2008 | Rosen | 368/63 |
| 7,457,203 | B2 * | 11/2008 | Nakagawa | 368/47 |
| 2005/0212698 | A1 * | 9/2005 | Barron et al. | 342/357.06 |
| 2008/0069189 | A1 * | 3/2008 | Srikantiah et al. | 375/150 |
| 2008/0084336 | A1 * | 4/2008 | Wang et al. | 341/51 |
| 2008/0150797 | A1 * | 6/2008 | Jia et al. | 342/357.06 |
| 2008/0304601 | A1 * | 12/2008 | Abraham et al. | 375/340 |

FOREIGN PATENT DOCUMENTS

| | | |
|---|---|---|
| JP | 07311254 | 11/1995 |
| JP | 10010251 | 1/1998 |
| WO | WO 95/27927 | 10/1995 |
| WO | 00/49737 | 8/2000 |
| WO | 2007/118327 A1 | 10/2007 |

* cited by examiner

*Primary Examiner* — Vit W Miska

(57) ABSTRACT

A satellite signal reception device has a reception unit that receives satellite signals transmitted from a positioning information satellite, a timekeeping unit that keeps time internally, a power supply unit that supplies power at least to the reception unit, a correlation process unit that is disposed in the reception unit and has a plurality of correlators for determining a correlation with the satellite signal when receiving satellite signals, and a correlation process count determination unit that determines how many correlators to use when the reception unit receives the satellite.

8 Claims, 17 Drawing Sheets

| NO. OF CORRELATORS | CURRENT CONSUMPTION | CAPTURE TIME |
|---|---|---|
| m | x+y | z |
| m/2 | x/2+y | z×2 |
| m/4 | x/4+y | z×4 |
| m/8 | x/8+y | z×8 |

m: MAXIMUM NUMBER OF CORRELATORS
x: CORRESPONDING CURRENT CONSUMPTION
y: CURRENT CONSUMPTION OF OTHER CIRCUIT PARTS
z: TIME UNTIL SATELLITE SIGNAL CAPTURED (SEARCH TIME)

SATELLITE SIGNAL RECEPTION DEVICE, TIMEKEEPING DEVICE WITH A SATELLITE SIGNAL RECEPTION DEVICE, AND SATELLITE SIGNAL RECEPTION METHOD

CROSS-REFERENCE TO RELATED APPLICATIONS

Japanese Patent application No.(s) 2007-179925 and 2008-039753 are hereby incorporated by reference in their entirety.

BACKGROUND

1. Field of Invention

The present invention relates to a satellite signal reception device that acquires time information by receiving a signal from a GPS satellite or other positioning information satellite, to a timekeeping device that has this satellite signal reception device, and to a satellite signal reception method.

2. Description of Related Art

The Global Positioning System (GPS) for determining the position of a GPS receiver uses GPS satellites that circle the Earth on a known orbit, and each GPS satellite has an atomic clock on board. Each GPS satellite therefore keeps the time (referred to below as the GPS time) with extremely high precision.

In order for the reception unit of the satellite signal reception device that receives signals from the GPS satellites to get the time information from a GPS satellite, the receiver must receive and decode the TOW signal (the Time of Week or GPS time, information that is reset weekly and indicates the number of seconds from the beginning of the week). See, for example, Japanese Unexamined Patent Appl. Pub. JP-A-H10-10251 (including abstract).

In order for the GPS receiver to receive this time information, it must first capture a signal from a GPS satellite orbiting the Earth. The GPS receiver must then receive and correlate the captured signals, and then perform certain operations to extract the time data.

More specifically, the GPS signal (signal from a GPS satellite) must be received through an antenna, converted to an intermediate frequency in the RF band, and then correlated by a baseband unit to extract the GPS signal. An operator then processes the extracted GPS signal to extract the time information. The GPS receiver generally has a plurality of reception channels, supplies a reference clock only to the reception channel used to capture and track signals from the GPS satellite needed to determine the current position, and thus reduces power consumption by the other reception channels. See, for example, Japanese Unexamined Patent Appl. Pub. JP-A-H07-311254.

In order to actually acquire the time information after receiving signals from the GPS satellite, the antenna unit, RF unit, baseband unit, and operating unit must be driven simultaneously.

In order to acquire the navigation message carried by the GPS satellite signal, the C/A (coarse/access) code must be interpreted.

The C/A code is a digital code containing irregularly inserted 0s and 1s known as a pseudo-random noise code (PN code). A different code pattern is assigned to each of the plural GPS satellites so that each satellite can be uniquely identified for signal reception and processing.

The satellite signal reception device usually receives the GPS signal through an antenna and converts the received signal to an intermediate frequency in the RF band. When the baseband unit then correlates the received signal, a plurality of correlators must be driven simultaneously.

As described above, the satellite signal reception device must simultaneously operate an antenna unit, RF unit, a plurality of correlators in the baseband unit, and a processor. The peak power requirement is therefore high. A large battery must be used to meet this peak power requirement. However, a clock, wristwatch, or similar timekeeping device incorporating such a satellite signal reception device is typically small. A large battery therefore cannot be used, and the timepiece or other electronic device thus using the satellite signal reception device therefore soon runs out of power.

SUMMARY OF INVENTION

A satellite signal reception device, a timekeeping device having a satellite signal reception device, and a satellite signal reception method according to the present invention enable acquiring time information from a GPS satellite or other positioning information satellite while suppressing the peak power consumption level.

A satellite signal reception device according to a first aspect of the invention has a reception unit that receives satellite signals transmitted from a positioning information satellite; a timekeeping unit that keeps time internally; a power supply unit that supplies power at least to the reception unit; a correlation process unit that is disposed in the reception unit and has a plurality of correlators for determining a correlation with the satellite signal when receiving satellite signals; and a correlation process count determination unit that determines how many correlators to use when the reception unit receives the satellite.

The reception unit in this aspect of the invention has a correlation process unit that has a plurality of correlators for determining a correlation with the satellite signal when receiving satellite signals, and a correlation process count determination unit determines how many correlators to use when the reception unit receives the satellite. The satellite signal reception device according to this aspect of the invention can therefore suppress the peak power consumption during satellite signal reception.

Because the correlation process count determination unit determines the number of correlators in the correlation process unit be used when the reception unit receives the satellite signals, the satellite signal reception device can easily reduce the peak power demand when reducing peak power consumption is desirable.

This aspect of the invention thus affords a satellite signal reception device that can receive satellite signals transmitted from a GPS satellite or other positioning information satellite while also suppressing peak power consumption.

Preferably, the satellite signal reception device also has a power threshold value determination unit that determines if a power consumption value representing the consumption of power supplied from the power supply unit is greater than or equal to a threshold value, and the correlation process count determination unit determines the number of correlators that are used based on the result from the power threshold value determination unit so that power consumption when receiving the satellite signal decreases.

This aspect of the invention has a power threshold value determination unit that determines if a power consumption value representing the consumption of power supplied from the power supply unit is greater than or equal to a threshold value. The correlation process count determination unit determines the number of correlators that are used based on the result from the power threshold value determination unit so that power consumption when receiving the satellite signal decreases. Power consumption can therefore be reduced when the reception unit receives signals from a GPS satellite or other positioning information satellite.

Further preferably, when amount-of-change information, which represents change in power consumption over time from the start of satellite signal reception, is relatively high, the correlation process count determination unit determines the number of correlators used so that there is a relative decrease in the amount-of-change information.

With this aspect of the invention the correlation process count determination unit determines the number of correlators used so that there is a relative decrease in the amount-of-change information when the amount-of-change information, which represents change in power consumption over time from the start of satellite signal reception, is relatively high. When the amount-of-change information, which is the change in power consumption, that is, the rate of the drop per unit time when the power supplied from the power supply unit, which is the power source, is consumed and drops with the start of reception, is great, this aspect of the invention reduces the rate of the drop per unit time in the power. This prevents the satellite signal reception device from shutting down due to a sudden reduction in the power supply voltage (also referred to as a voltage drop).

Further preferably, the satellite signal reception device also has a years-of-use counter unit that counts how many years the satellite signal reception device has been used. The correlation process count determination unit limits the number of correlators used based on the years-of-use count counted by the years-of-use counter unit.

In this aspect of the invention the correlation process count determination unit has a years-of-use counter unit that counts how many years the satellite signal reception device has been used, and limits the number of correlators used based on the years-of-use count counted by the years-of-use counter unit. If the years-of-use count is long and the power supply capacity of the power supply unit has decreased, this aspect of the invention enables limiting how much power is consumed by the reception unit by limiting the number of correlators in the correlation process unit. The satellite signal reception device can also be prevented from shutting down as a result of an insufficient power supply.

Further preferably, the satellite signal reception device also has an environment evaluation unit that evaluates the operating environment of the satellite signal reception device, and the correlation process count determination unit determines the number of correlators used based on the result from the environment evaluation unit.

With this aspect of the invention the correlation process count determination unit has an environment evaluation unit that evaluates the operating environment of the satellite signal reception device, and determines the number of correlators used in the correlation process unit based on the result from the environment evaluation unit. How many correlators are used can thus be determined according to the operating environment of the satellite signal reception device.

Further preferably, the environment evaluation unit is a temperature detection unit that detects the temperature of the operating environment of the satellite signal reception device.

In this embodiment of the invention the correlation process count determination unit determines how many correlators are used based on the temperature of the operating environment of the satellite signal reception device that is detected by the temperature detection unit used as the environment evaluation unit. When the temperature of the operating environment is low, the amount of power that the power supply unit can supply drops. However, by detecting the temperature of the operating environment and adjusting the number of correlators used in the correlation process unit according to the detected ambient temperature, the likelihood of the satellite signal reception device shutting down because of an insufficient power supply can be reduced.

Yet further preferably, the satellite signal reception device also has a time adjustment information storage unit that acquires at least satellite time information from the satellite signal and stores the acquired satellite time information as time adjustment information, and a time display unit that corrects and displays the internally kept time information based on the time adjustment information.

This aspect of the invention enables the satellite signal reception device to correct the internally kept time and display the correct time based on the time adjustment information, which is the satellite time information acquired from the satellite signal.

Another aspect of the invention is a timekeeping device with a satellite signal reception device having a reception unit that receives satellite signals transmitted from a positioning information satellite; a timekeeping unit that keeps time internally; a power supply unit that supplies power at least to the reception unit; a correlation process unit that is disposed in the reception unit and has a plurality of correlators for determining a correlation with the satellite signal when receiving satellite signals; and a correlation process count determination unit that determines how many correlators to use when the reception unit receives the satellite.

Yet another aspect of the invention is a satellite signal reception method of a satellite signal reception device that has a reception unit that receives satellite signals transmitted from a positioning information satellite; a timekeeping unit that keeps time internally; a power supply unit that supplies power at least to the reception unit; a correlation process unit that is disposed in the reception unit and has a plurality of correlators for determining a correlation with the satellite signal when receiving satellite signals. The satellite signal reception method includes a correlation process count determination unit that determines how many correlators to use when the reception unit receives the satellite; and a step of determining a correlation with the satellite signal by means of the correlation process unit using the number of correlators determined by the correlation process count determination unit.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures. Note that the following embodiments are preferred specific implementations of the invention and therefore describe some technically preferred limitations, but the scope of the invention is not limited thereto unless specifically stated as required by the invention.

Embodiment 1

Figure 1:
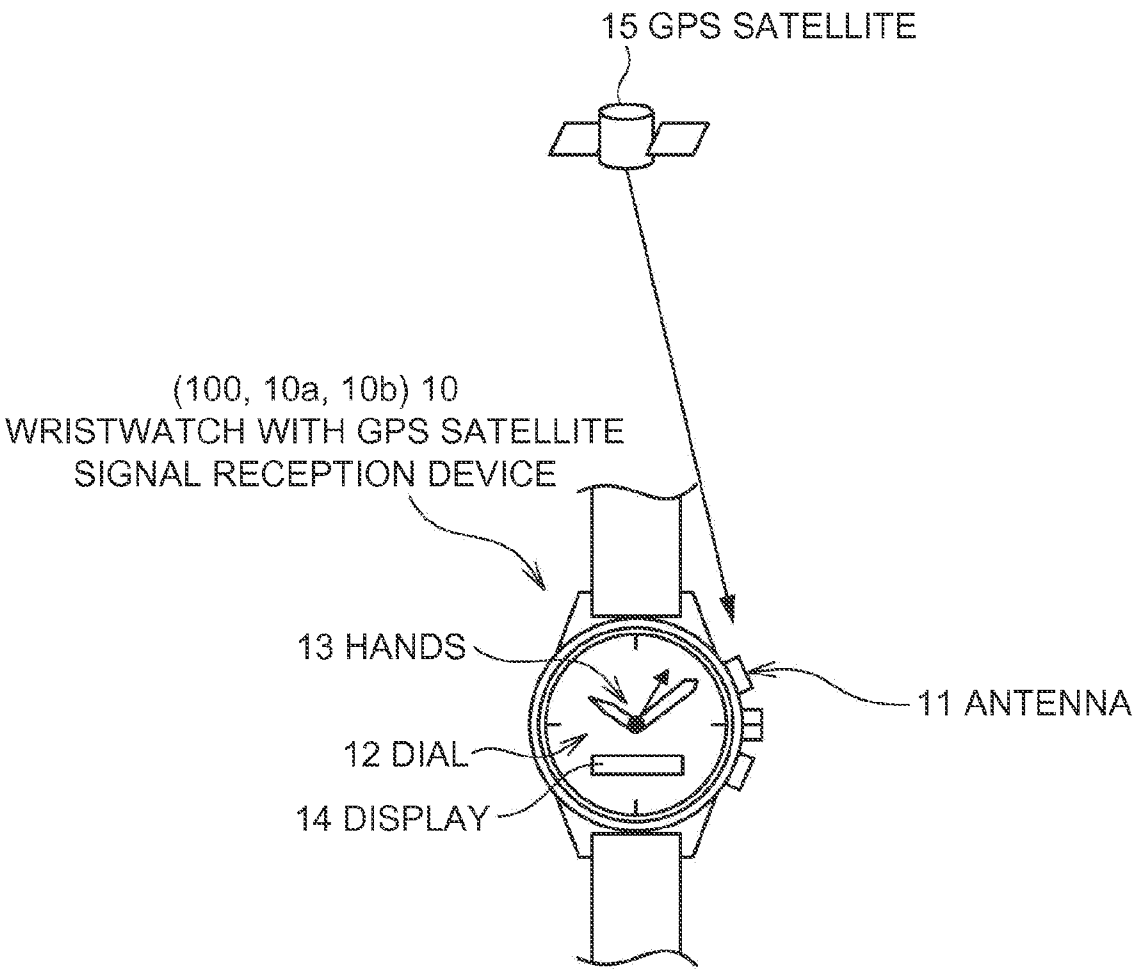
FIG. 1 is a schematic diagram of a wristwatch with a GPS satellite signal receiver according to a first embodiment of a timekeeping device with a satellite signal reception device according to the present invention.
Figure 2:
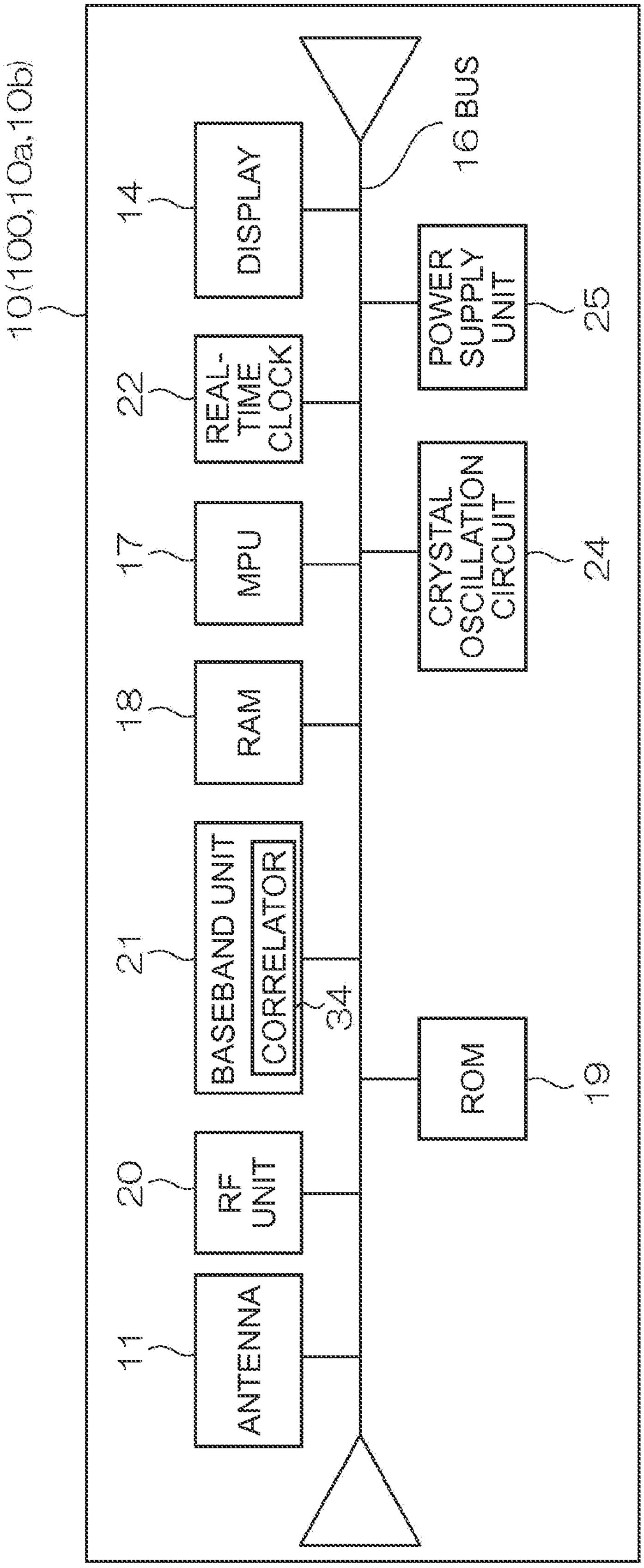
FIG. 2 is a block diagram of the main internal hardware arrangement of the wristwatch with GPS receiver shown in FIG. 1.

FIG. 1 shows a wristwatch with GPS receiver 10 (referred to herein as a GPS wristwatch 10) as an example of a timekeeping device with a satellite signal reception device according to the present invention. FIG. 2 is a block diagram of the main internal hardware arrangement of the GPS wristwatch 10 shown in FIG. 1.

As shown in FIG. 1, the GPS wristwatch 10 has a dial 12 with a hands 13 including a long hand and a short hand for indicating the time on the face, and a display 14 such as an LED display for presenting information and messages. The display 14 is not limited to an LED device and could be an LCD or an analog display. The dial 12, hands 13, and display 14 are examples of a time display unit.

As also shown in FIG. 1 the GPS wristwatch 10 also has an antenna 11. This antenna 11 is used for receiving signals from a GPS satellite 15 circling the Earth on a fixed orbit in space. The GPS satellite 15 is an example of a positioning information satellite that orbits the Earth.

As shown in FIG. 2, the GPS wristwatch 10 has an internal timekeeping mechanism and GPS receiver assembly, and components for functioning as a computer.

More particularly, the timekeeping assembly of the GPS wristwatch 10 according to this embodiment of the invention is an electronic timepiece.

The components of the GPS wristwatch 10 shown in FIG. 2 are described below.

As shown in FIG. 2 the GPS wristwatch 10 has a bus 16. Connected to this bus 16 are an MPU (micro processing unit) 17, RAM (random access memory) 18, and ROM (read-only memory) 19.

A GPS arrangement for receiving satellite signals is also connected to the bus 16.

More specifically, the antenna 11, an RF (radio frequency) unit 20 and a baseband unit 21 are connected to the bus 16. The RF unit 20 converts the received signals to an intermediate frequency. The baseband unit 21 has a correlator 34 for demodulating the signals acquired from the RF unit 20.

The signals received from the GPS satellite 15 in FIG. 1 pass from the antenna 11 through the RF unit 20 and are output by the baseband unit 21 as the GPS signals, which are stored in RAM 18.

The RF unit 20 and baseband unit 21 are an example of a reception unit for receiving satellite signals, and are also referred to collectively below as the reception unit side.

The GPS signals stored in RAM 18 are processed by the MPU 17 to extract the navigation message carried by the GPS satellite signal and retrieve the GPS time information (Z count), for example. The signals received from the GPS satellites are described in detail below.

The MPU 17 is an example of a satellite signal processing unit that acquires the satellite time information such as the Z count.

A timekeeping mechanism is also connected to the bus 16. This timekeeping mechanism includes a real-time clock 22 (RTC) such as an integrated circuit (semiconductor integrated circuit) and crystal (Xtal) oscillation circuit 24.

A power supply unit 25 such as a battery for supplying power to the GPS wristwatch 10, and the display 14 shown in FIG. 1, are also connected to the bus 16.

The bus 16 thus is an internal bus with addresses and data paths that function to connect all other devices. Various operating programs and information are stored in ROM 19, which is also connected to the bus 16. The MPU 17 uses RAM 18 to execute the programs and access ROM 19.

The real-time clock 22 is an example of a timekeeping unit that keeps the time, and the RF unit 20 is an example of a reception unit that receives satellite signals transmitted from the positioning information satellite (GPS satellite 15).

Figure 3:
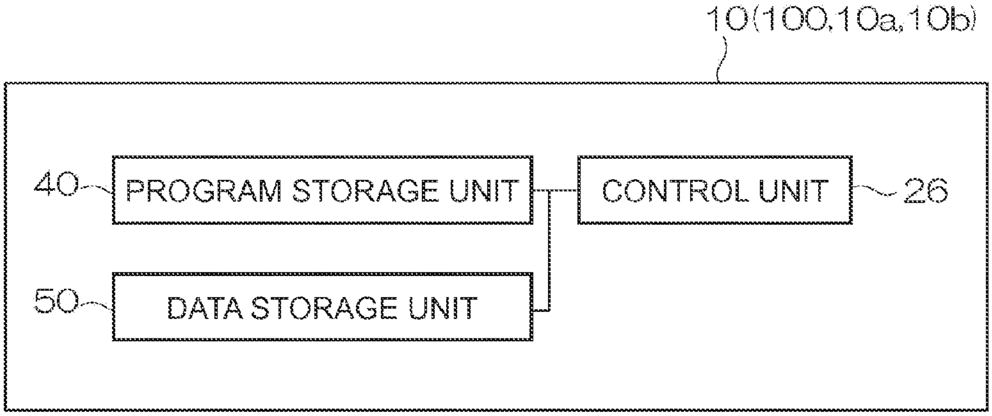
FIG. 3 is a block diagram showing the main software configuration of the wristwatch with GPS receiver.

FIG. 3 is a block diagram showing the general software arrangement of the GPS wristwatch 10.

As shown in FIG. 3 the GPS wristwatch 10 has a control unit 26. The control unit 26 runs the programs stored in the program storage unit 40, including a program for processing signals from the GPS satellites and a program for adjusting the internally kept time, and processes the data stored in the data storage unit 50. The control unit 26 is thus an arrangement for controlling the GPS wristwatch 10.

The program storage unit 40 and data storage unit 50 are shown as discrete units in FIG. 3, but the data and programs are not actually stored separately and are simply shown this way for convenience.

Figure 4:
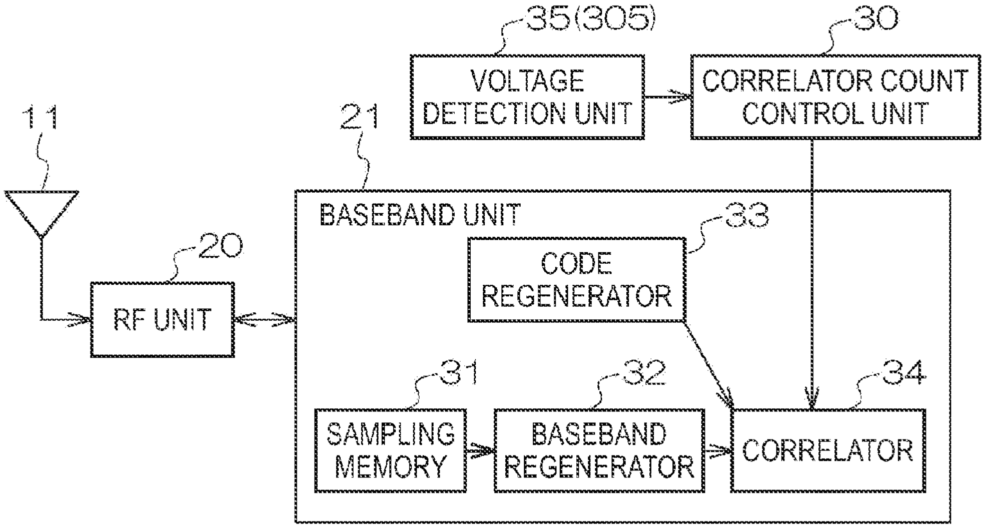
FIG. 4 is a schematic function block diagram of a wristwatch with GPS receiver according to the first and fourth embodiments of the invention.
Figure 5:
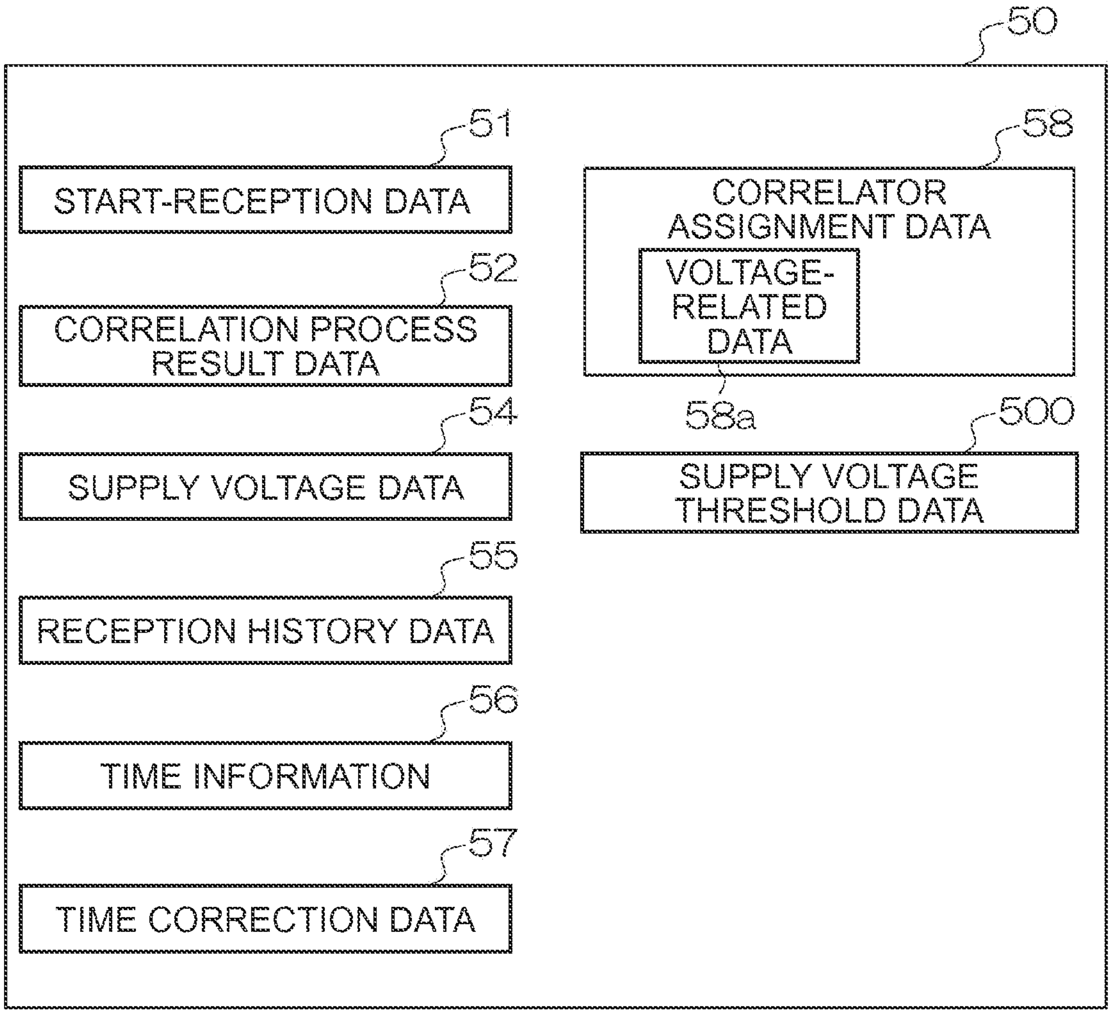
FIG. 5 is a block diagram showing the data stored in the data storage unit shown in FIG. 3.

FIG. 4 shows the general hardware arrangement for processing primarily signals from the GPS satellites by executing a program stored in the program storage unit 40 in FIG. 3. FIG. 5 is a block diagram showing data stored in the data storage unit 50 in FIG. 3.

In order to receive satellite signals from the GPS satellite 15 and acquire the time information and other data, signals must be received from the GPS satellite through the antenna 11 and RF unit 20 shown in FIG. 4, and processed by the baseband unit 21.

The RF unit 20 receives and digitizes the satellite signals from the GPS satellite 15. The baseband unit 21 correlates the received satellite signals.

More specifically, the antenna 11 starts searching for a GPS satellite 15 from which a signal can be received at the current location, and receives the satellite signal transmitted from a GPS satellite 15 from which signals can be received.

This satellite signal is modulated by the transmitting GPS satellite 15 using a C/A code, which is an example of a code (also called code data) known as a pseudo-random noise code (PN code), and carries data including the GPS time information (Z count) and GPS satellite orbit information (including the ephemeris and almanac data).

This GPS time information (Z count) and GPS satellite orbit information (including the ephemeris and almanac data) is collectively called the navigation message.

Figure 22A:
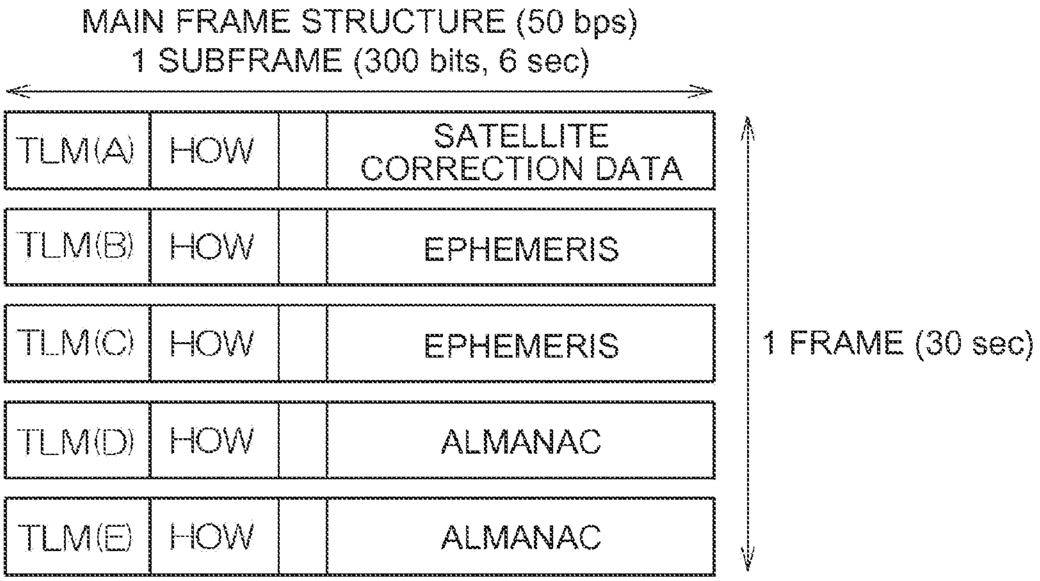
FIGS. 22A and 22B are tables showing the structure of the satellite signal.

The navigation message, which is the satellite signal transmitted by the GPS satellite is described below with reference to FIG. 22.

The GPS satellite 15 transmits signals in data frame units and transmits one frame every 30 seconds. Each frame consists of five subframes, and one subframe is transmitted every 6 seconds. Each subframe contains 10 words (1 word is transmitted every 0.6 second).

Figure 22B:
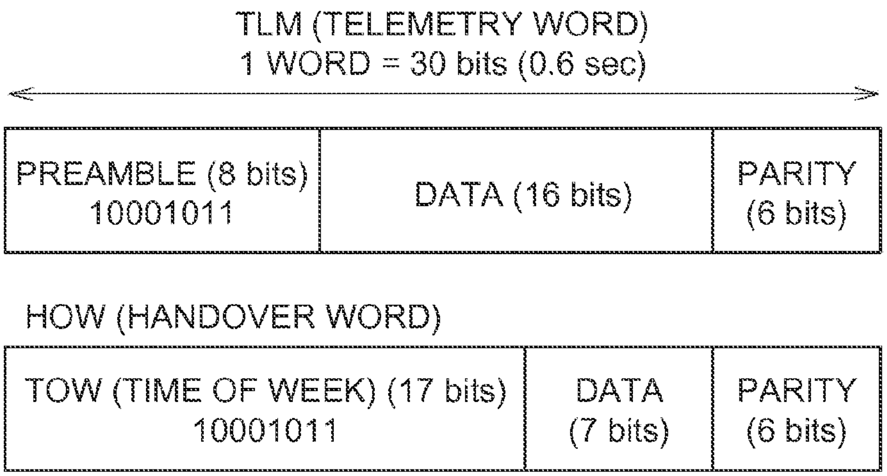

The first word in each subframe is a telemetry (TLM) word storing the TLM data, and each TLM word starts with a preamble as shown in FIG. 22B.

The TLM word is followed by a handover word HOW storing the HOW (handover) data, and each HOW starts with the time of week (TOW) indicating the GPS time information (Z count) of the GPS satellite 15.

The Z count stores the time of the beginning of the TLM in the next subframe.

The GPS time is the number of seconds since 00:00:00 Sunday night of each week, and is reset to zero at precisely 00:00:00 every Sunday night. The Z count, or GPS time information, can therefore be acquired by reading the HOW, which is the second word in the subframe.

This embodiment of the invention acquires this GPS time information and based thereon adjusts the time kept internally.

Satellite signals as described above are transmitted from the GPS satellite 15, and this navigation message must be acquired in order to get the time information from the navigation message, which is the satellite signal transmitted form the GPS satellite 15. The GPS wristwatch 10 must therefore acquire the C/A code described above. The C/A code is unique to each GPS satellite 15, and the C/A codes are known. The reception unit side can therefore identify each GPS satellite 15 based on the detected C/A code, and can thereby receive the satellite signal.

In order for the reception unit to receive a satellite signal from a GPS satellite 15, the reception unit must generate the same code as the C/A code unique to the GPS satellite 15 and thereby synchronize with the signal from the GPS satellite 15.

More specifically, the satellite signal is modulated by the transmitting GPS satellite 15 using a C/A code, which is an example of a pseudo random noise code (PN code). By generating a replica signal (or simply replica) that is the same code as this C/A code and correlating with the received signal, the reception unit can extract the GPS time information (Z count) and the GPS satellite 15 orbit information (the ephemeris and almanac data) as data from the satellite signal.

As shown in FIG. 4, the satellite signal can be acquired through the antenna 11 that is an example of the reception unit and the RF unit 20 and baseband unit 21.

More specifically, a satellite signal input from the antenna 11 in FIG. 4 is input to the RF unit 20 in FIG. 4. The RF unit 20 in FIG. 4 has a filter not shown that is a frequency conversion unit for converting the satellite signal to an intermediate frequency. The signal converted to an intermediate frequency is input to an A/D conversion unit not shown and converted thereby to a digital signal.

The satellite signal input through the antenna 11 is thus converted by a filter in the RF unit 20 to an intermediate frequency, then input to the A/D conversion unit and converted thereby to a digital signal. The digital signal is then sampled, and the sampling data is temporarily stored in the sampling memory 31 shown in FIG. 4.

The sampling data temporarily stored to the sampling memory 31 in FIG. 4 is then reproduced by the baseband regenerator 32, and input to the correlator 34 as a regenerated baseband signal.

The code regenerator 33 in FIG. 4 generates a pattern identical to the C/A code of the GPS satellite 15, that is, generates a replica of the C/A code of the GPS satellite 15. This replica signal is also input to the correlator 34.

The correlator 34 shown in FIG. 4 determines the correlation between the regenerated baseband signal and the replica signal. The process executed by the baseband unit 21 is described more specifically below with reference to FIG. 23.

Figure 23:
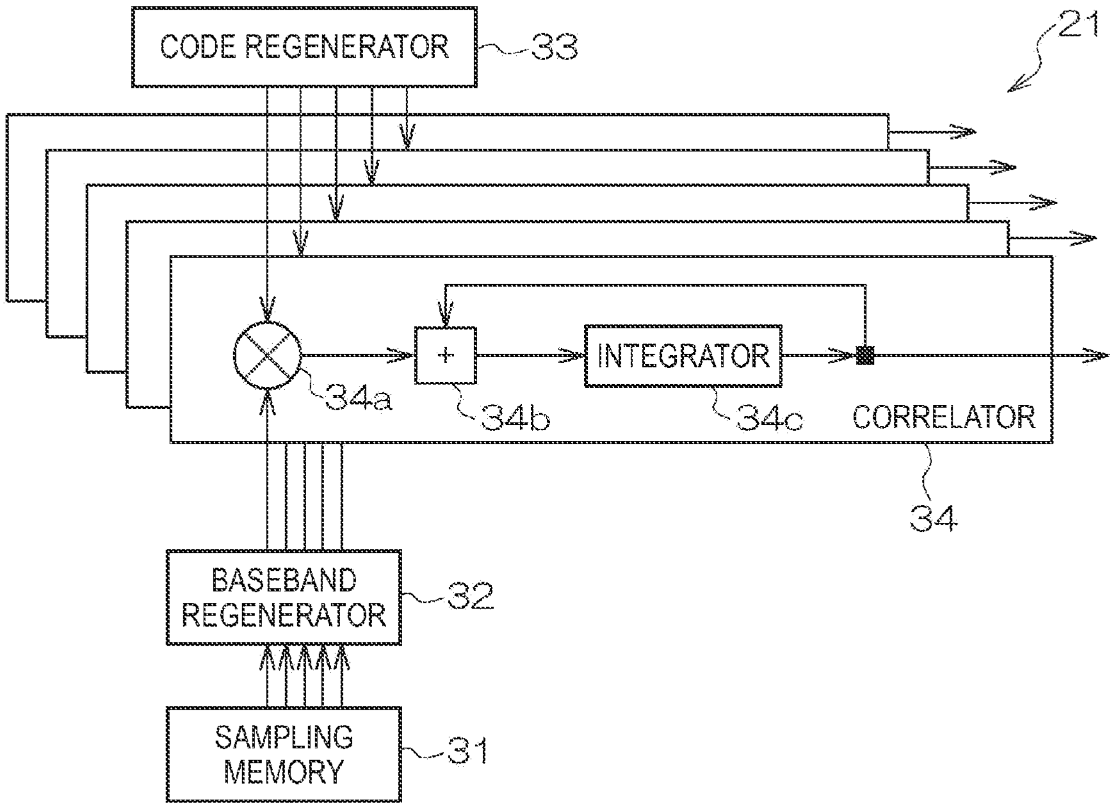
FIG. 23 is a schematic diagram showing processing by the baseband unit.

As shown in FIG. 23, the sampling data stored in the sampling memory 31 is output as the regenerated baseband signal by the baseband regenerator 32, input together with the replica signal generated by the code regenerator 33 to the multiplier 34*a* of the correlator 34, and the multiplier 34*a* outputs a correlation value. This correlation value is input to an adder 34*b* and an integrator 34*c* then integrates the correlation values for one C/A code period. If the integral is greater than a predetermined threshold value, the C/A code of the received satellite signal and the replica signal of the C/A code generated on the reception unit side match.

In order for the baseband unit 21 to efficiently correlate the satellite signal from the GPS satellite 15, the code regenerator 33 generates multiple signals and a plurality of correlators 34 are operated simultaneously in order to complete the signal correlation in a single operation.

Processing time can thus be shortened because the baseband unit 21 only needs to execute the correlation process once, but the peak power consumption of this operation therefore also rises. This embodiment of the invention solves this problem by adjusting the number of correlators 34 that are driven as needed, thereby reducing the peak power consumption as described below with reference to FIG. 15 and FIG. 16.

Figures 15, 16:
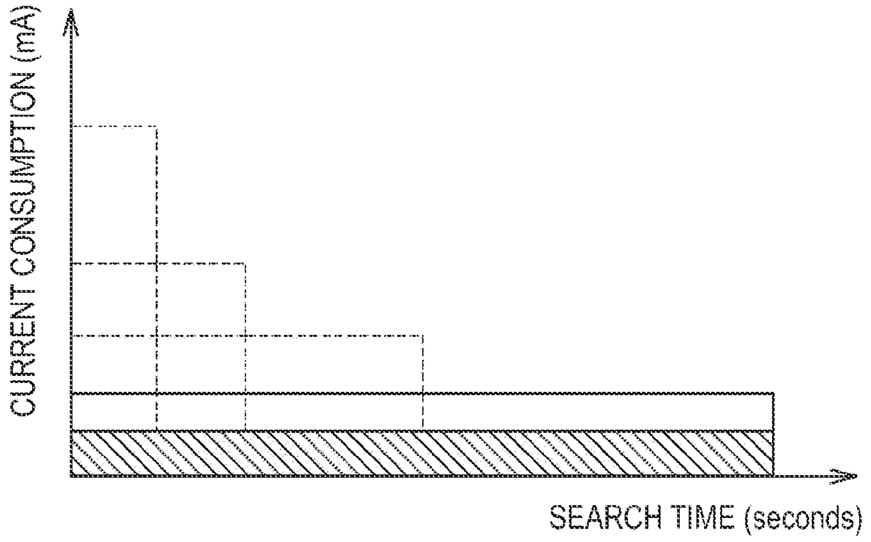
FIG. 15 is a graph showing the relationship between the number of correlators, current consumption, and signal capture time (satellite search time, also simply called search time).
FIG. 16 is a table showing the relationship between the number of correlators, current consumption, and signal capture time (satellite search time, also simply called search time).

FIG. 15 and FIG. 16 show an example of the relationship between the number of correlators 34, current consumption, and capture time (the time required to locate a satellite starting from when GPS satellite 15 signal reception starts, the satellite signal is received, reception ends, and the satellite signal is acquired, also called simply the search time).

FIG. 15 shows the relationship between the search time (seconds) on the x-axis and current consumption (mA) on the y-axis. In the table in FIG. 16 the maximum number of correlators 34 is denoted m, the current consumption (power consumption) when all m correlators 34 operate simultaneously is denoted x, the total current consumption (power consumption) of other circuit parts is denoted y, and the capture time when the number of correlators 34 is m is denoted z. If the number of operating correlators 34 is m, m/2, m/4, m/8, the power consumption of each correlator 34 as a portion of total current consumption (power consumption) is x, x/2, x/4, x/8, and the capture time (search time) is z, z*2, z*4, z*8. The peak power consumption, which is the current consumption (power consumption) when searching for a satellite, can therefore be reduced by adjusting the number of operating correlators 34. The minimum operating voltage is 3.0 V in this embodiment by way of example, but this is to assure the required operating power when other circuit sections are also operating.

More specifically, as shown in FIG. 4, the correlator 34 of the GPS wristwatch 10 according to this embodiment of the invention has a correlator count control unit 30.

The correlator count control unit 30 determines the number of correlators 34 that operate based on the result returned by the voltage detection unit 35. The voltage detection unit 35 executes a power supply voltage threshold value evaluation program. This supply voltage threshold value evaluation program compares the supply voltage threshold data 500 shown in FIG. 5 with the supply voltage data 54 shown in FIG. 5, and determines if the supply voltage data 54 is greater than or equal to the supply voltage threshold data 500. This supply voltage threshold data 500 is set to a level enabling supplying the required power when all of the correlators 34 and other circuit sections operate, and is set to 4.0-4.2 V in this embodiment.

A voltage control circuit not shown executes a voltage verification program to confirm, for example, the voltage of the power supply unit 25 shown in FIG. 2, and stores the result in the supply voltage data 54 shown in FIG. 5. The supply voltage threshold value evaluation program passes the resulting evaluation to the correlator count control unit 30 in FIG. 4. Based on the result of this evaluation, the correlator count control unit 30 runs a correlator adjustment program to reference the voltage-related data 58*a* in the correlator assignment data 58 in FIG. 5.

Figure 17:
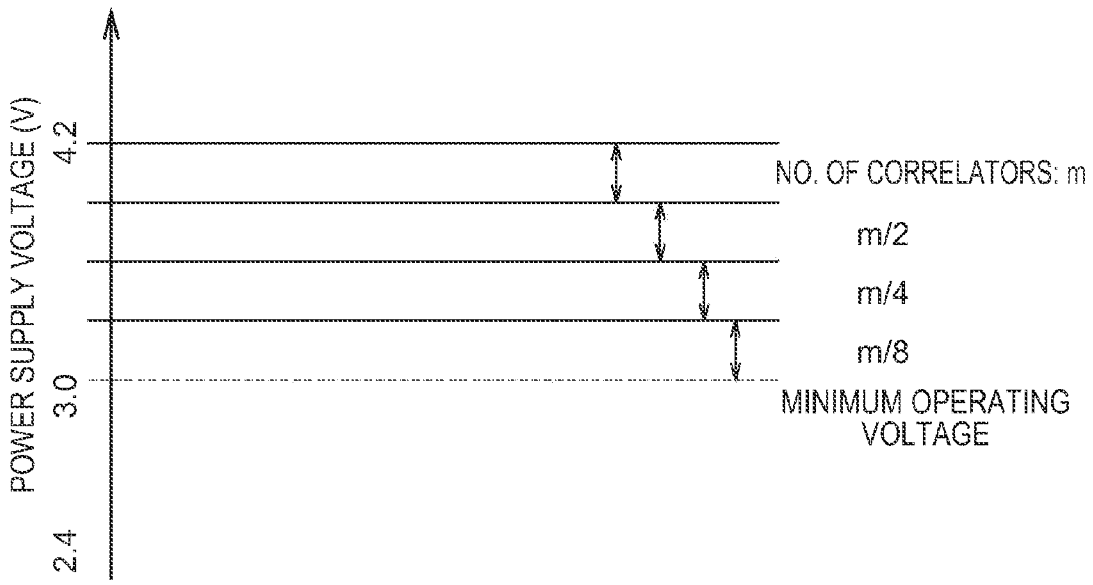
FIG. 17 shows an example of the reference data used by the correlation process count determination unit for determining the number of correlation processing units operated.

The voltage-related data 58*a* is related to the correlator assignment data 58 as schematically shown in FIG. 17. That is, when the supply voltage data 54 in FIG. 5, which is the voltage of the power supply, is greater than 3.0 V and less than or equal to 3.3 V, the number of correlators 34 operated is m/8. If the supply voltage data 54 is greater than 3.3 V and less than or equal to 3.6 V, the number of correlators 34 operated is m/4. If the supply voltage data 54 is greater than 3.6 V and less than or equal to 3.9 V, the number of correlators 34 operated is m/2. If the supply voltage data 54 is greater than 3.9 V and less than or equal to 4.2 V, the number of correlators 34 operated is m.

The correlator count control unit 30 is an example of a number of correlation processes decision unit. The correlator 34 is an example of a plurality of correlators 34, and an example of a correlation process unit. The voltage detection unit 35 is an example of a power threshold value determination unit.

The GPS wristwatch 10 includes an arrangement for receiving satellite signals from a GPS satellite, which is an example of a positioning information satellite, and acquiring display time information. The GPS wristwatch 10 also has a function for adjusting the displayed time information using this time information acquired from the positioning information satellite.

Figure 6:
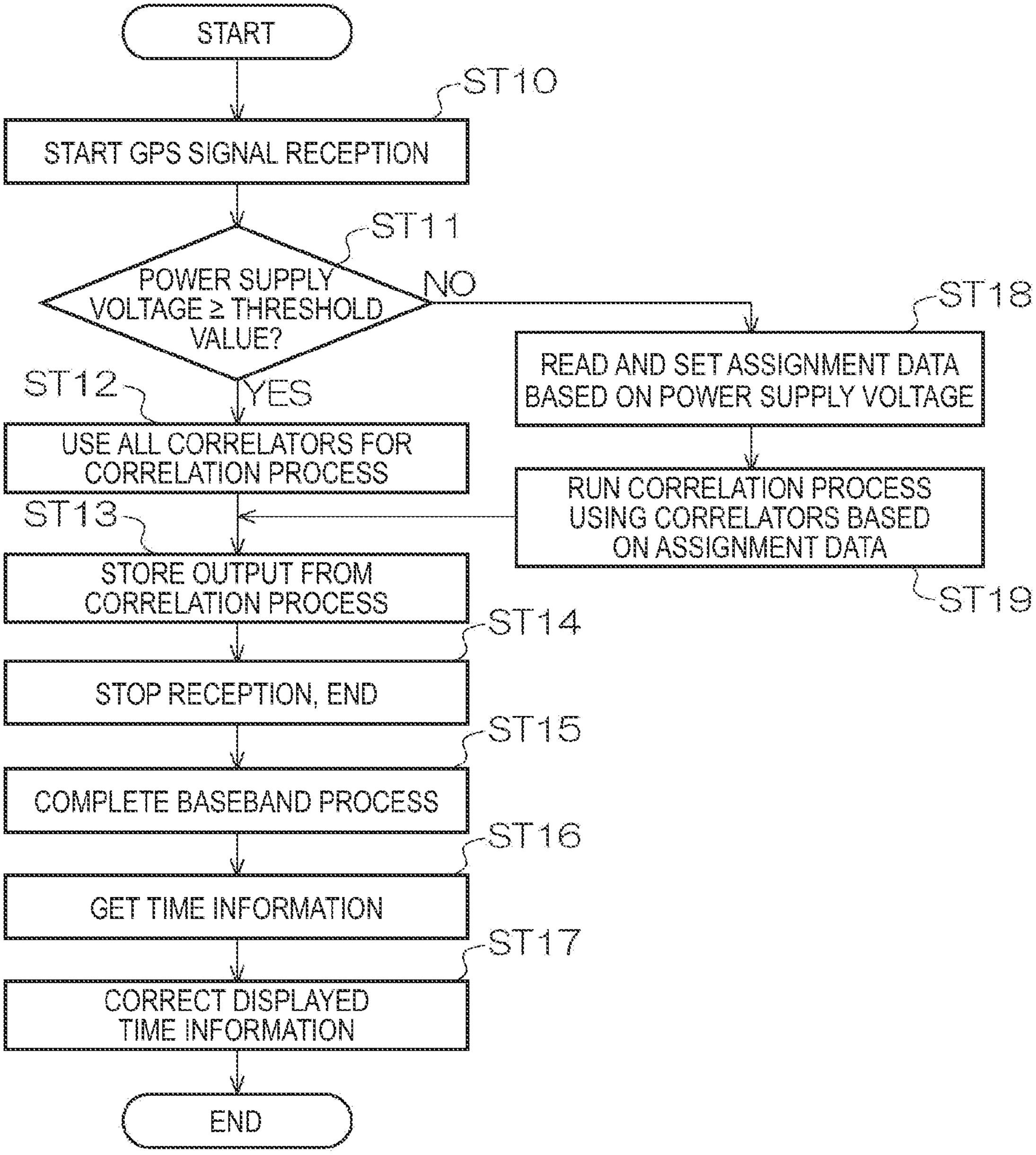
FIG. 6 is a flow chart showing the main steps in the operation of the wristwatch with GPS receiver according to the first embodiment of the invention.

FIG. 6 is a flow chart describing the main steps in the operation of the GPS wristwatch 10 according to this embodiment of the invention.

The programs and data shown in FIG. 4 and FIG. 5 are described in relation to the operation of the GPS wristwatch 10 according to the present invention as described below with reference to the flow chart in FIG. 6.

The GPS wristwatch 10 shown in FIG. 1 according to this embodiment of the invention automatically corrects the time kept by the real-time clock 22 once a day, that is, once every 24 hours. As shown in step ST10 in FIG. 6, the start-reception data 51 in FIG. 5 is first referenced, and if it is time to receive the time signal, that is, if 24 hours have passed, the RF unit 20 and baseband unit 21 shown in FIG. 2 as an example of the reception unit are operated to start receiving satellite signals from the GPS satellite 15.

In this embodiment of the invention this step is a so-called cold start because there is no almanac data available to reference, and the reception unit therefore starts searching for a GPS satellite 15.

Whether the power supply voltage is greater than or equal to a threshold value is determined in step ST11. As described above, the voltage detection unit 35 shown in FIG. 4 therefore executes the supply voltage threshold value evaluation program. The supply voltage threshold value evaluation program compares the supply voltage threshold data 500 in FIG. 5 with the supply voltage data 54 in FIG. 5, and determines if the supply voltage data 54 is greater than or equal to the supply voltage threshold data 500.

If the supply voltage data 54 is greater than or equal to the supply voltage threshold data 500, control goes to step ST12.

In step ST12 all of the correlators 34 execute the correlation process.

More specifically, as shown in FIG. 23, the GPS wristwatch 10 has a plurality of correlators 34 shown in FIG. 4. In order for the GPS wristwatch 10 according to this embodiment of the invention to search for a GPS satellite 15 and receive the satellite signal, the code regenerator 33 generates a plurality of signals, and the plural correlators 34 are simultaneously operated to acquire the signal correlation in a single operation. This shortens the time required for the search. The plural correlators 34 can be rendered as discrete hardware devices or in software.

If in step ST11 the power supply voltage is not greater than or equal to the threshold value, that is, the supply voltage data 54 in FIG. 5 is less than the supply voltage threshold data 500 also shown in FIG. 5, control goes to step ST18.

Step ST18 determines the assignment data referenced by the supply voltage. More specifically, as described above, the correlator adjustment program of the correlator count control unit 30 in FIG. 4 references the voltage-related data 58*a* of the correlator assignment data 58 in FIG. 5 based on the supply voltage data 54 in FIG. 5, which is the evaluation result.

More specifically, if the supply voltage data 54 in FIG. 5 is greater than 3.0 V and less than or equal to 3.3 V as shown in FIG. 17, the number of correlators 34 selected to operate based on the voltage-related data 58*a* is m/8 in this embodiment of the invention.

Control then goes to step ST19, and the correlation process is run by the number of correlators 34 based on the assignment data. More specifically, the correlator adjustment program of the correlator count control unit 30 in FIG. 4 references the voltage-related data 58*a* of the correlator assignment data 58 in step ST18. In this example the number of correlators 34 selected to operate based on the voltage-related data 58*a* is m/8. Based on the voltage-related data 58*a*, the correlator count control unit 30 therefore causes m/8 correlators 34 in FIG. 4 to operate. The correlation process is then executed in the baseband unit 21 in FIG. 4 using the m/8 correlators 34 as described above. By thus controlling the number of correlators 34 that operate at one time, the GPS wristwatch 10 according to this embodiment of the invention can suppress the peak power consumption.

The GPS wristwatch 10 according to this aspect of the invention thus prevents a system shutdown caused by peak power consumption momentarily exceeding the power supply capacity.

The data acquired by the correlation process is then stored in step ST13. More specifically, the data output by the correlators 34 of the baseband unit 21 in FIG. 4 is stored to the correlation process result data 52 in FIG. 5. Because this data is the correlated data, it is also the satellite signal data received from the GPS satellite 15 (see FIG. 22). Information for the GPS satellite 15 from which the satellite signal was received is stored in the reception history data 55 in FIG. 5. More specifically, the reception history data 55 contains the time and weekday that reception was successful, or the C/A code. By thus storing the reception history data 55 internally, the GPS wristwatch 10 can reference the reception history data 55 when searching for a reception history data 55 next time so that signal reception from the GPS satellite 15 can start quickly without acquiring the almanac from the satellite signal received from the GPS satellite 15.

In step ST14 reception of the satellite signal from the GPS satellite 15 stops and ends. More specifically, the supply of power from the power supply unit 25 in FIG. 2 is controlled to stop supplying power to the RF unit 20 and baseband unit 21, that is, the reception unit. If one GPS satellite 15 is located and the satellite signal is captured, the time information is acquired from the satellite signal of the GPS satellite 15 and reception can then be stopped. The reception time can therefore be shortened and power consumption can be reduced.

Control then goes to step ST15 and baseband processing ends. The time information is then acquired in step ST16. More specifically, the time adjustment information acquisition program stored in RAM 18 and ROM 19 in FIG. 2 acquires the time information from the satellite signal of the GPS satellite 15 from the correlation process result data 52, and stores the time information in the time correction data 57 in FIG. 5.

The displayed time information is then corrected in step ST17. More specifically, the time adjustment program corrects the time information 56 in FIG. 5, which is the time information of the real-time clock 22 in FIG. 2, based on the time correction data 57 in FIG. 5, and adjusts the time shown in the display 14 shown in FIG. 1 and FIG. 2 and by the hands 13 of the dial 12. The time correction data 57 is thus an example of the time adjustment information.

The first embodiment of the invention is as described above.

When the reception unit of the GPS wristwatch 10 according to this embodiment of the invention receives signals from a GPS satellite 15, the correlator count control unit 30 (an example of a correlation process determination unit) determines the number of the correlators 34 (an example of a correlation process unit that has a plurality of correlators) that are used. Power consumption can therefore be easily reduced when reducing the peak power consumption is desirable.

The GPS wristwatch 10 also has an arrangement that can correct the time information 56, which is an example of internally kept time information, based on the time correction data 57, which is an example of time adjustment information. As a result, the GPS wristwatch 10 according to this embodiment of the invention can suppress the peak value of the consumed power. Moreover, time information can be acquired from a GPS satellite or other positioning information satellite so that the GPS wristwatch 10 can adjust the displayed time.

Embodiment 2

Figure 7:
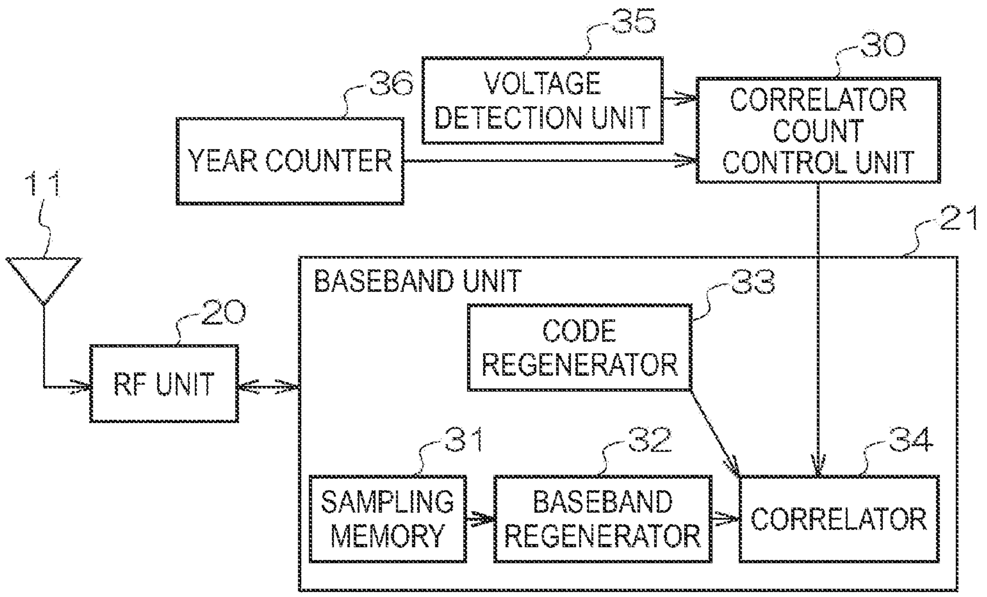
FIG. 7 is a schematic function block diagram of a wristwatch with GPS receiver according to a second embodiment of the invention.
Figure 8:
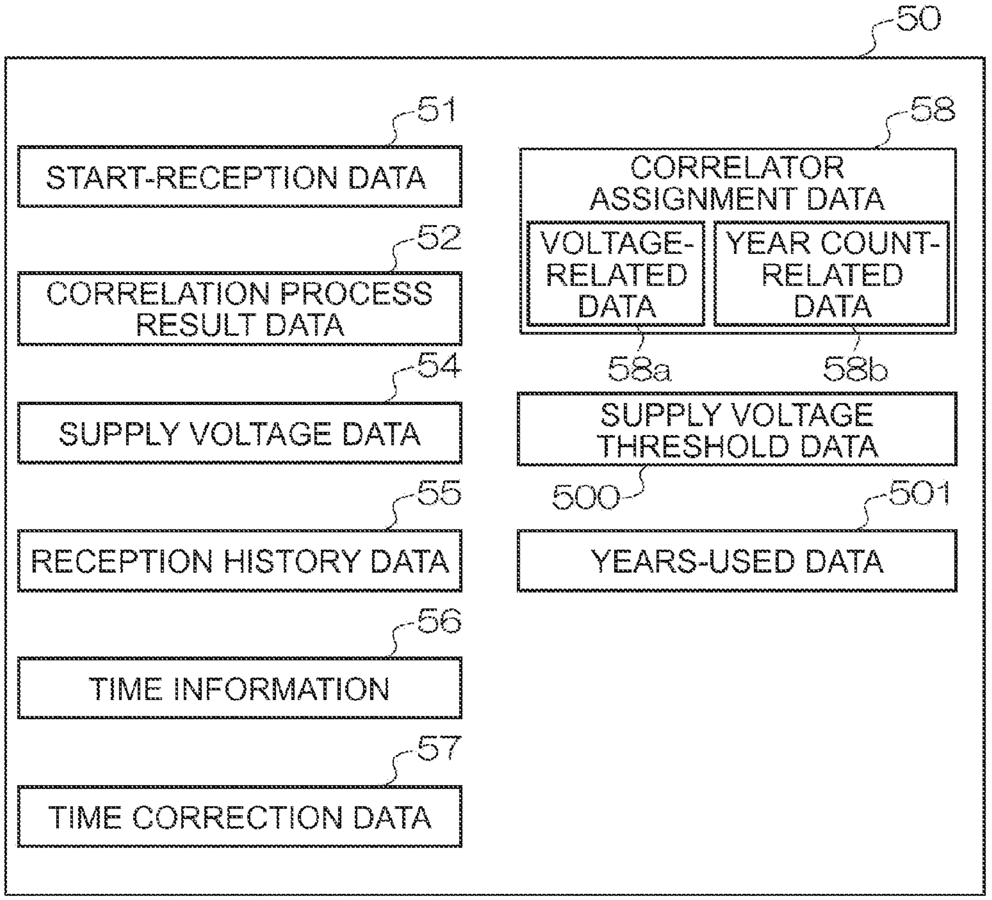
FIG. 8 is a block diagram showing the main data elements in a wristwatch with GPS receiver according to a second embodiment of the invention.
Figure 9:
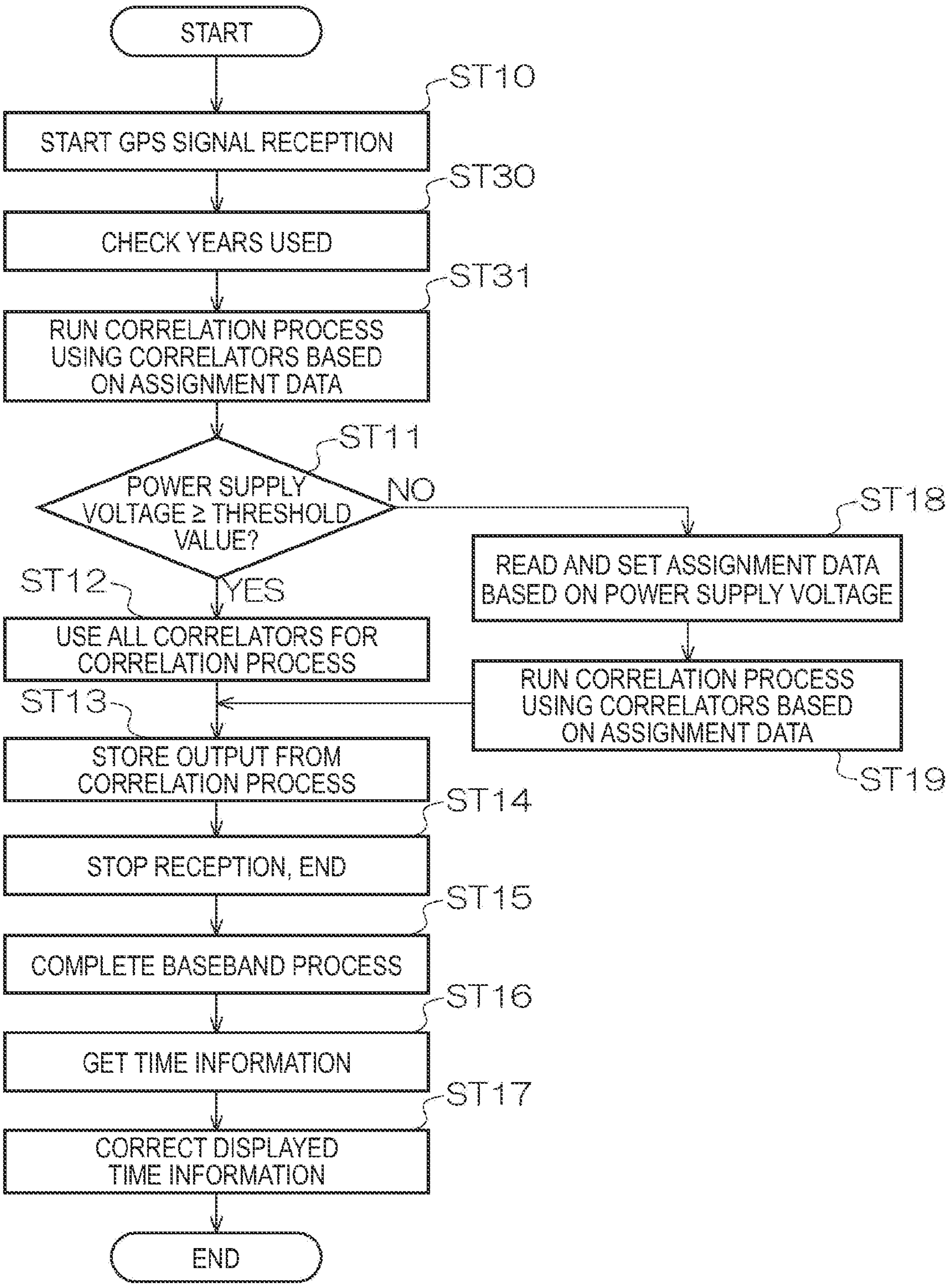
FIG. 9 is a flow chart showing the main steps in the operation of the wristwatch with GPS receiver according to the second embodiment of the invention.

FIGS. 7 and 8 a function block diagram and block diagram describing a GPS wristwatch 100 (see FIG. 1) according to a second embodiment of the invention. FIG. 9 is a flow chart describing the operation of the GPS wristwatch 100 according to this embodiment of the invention.

The arrangement of the GPS wristwatch 100 according to this embodiment of the invention is substantially identical to the GPS wristwatch 10 described in the first embodiment, like parts are identified by the same reference numerals, and the differences therebetween are described below.

This embodiment differs from the first embodiment in that the correlator count control unit 30 shown in FIG. 7 also considers the result supplied from the year counter 36. As a result, the data storage unit 50 also stores year count-related data 58*b* in the correlator assignment data 58, and years-used data 501, as shown in FIG. 8. As shown in the flow chart in FIG. 9, there is also an extra step ST30 for determining how many years have passed between steps ST10 and ST11.

Primarily these differences are described below.

In FIG. 9, receiving the GPS signal starts in step ST10 based on the start-reception data 51 in FIG. 8 in the same way as described above in the first embodiment.

Control then goes to step ST30, which is where this embodiment differs from the first embodiment.

In the second embodiment the number of years that the battery or other power supply unit 25 (see FIG. 2) that supplies power to the GPS wristwatch 100 is checked. That is, the years-passed counting program of the year counter 36 in FIG. 7 counts how many years the device (primarily the power supply unit 25, which is a battery or other power supply device) has been used, and records this count in the years-used data 501 in FIG. 8. The years-of-use count verification program of the year counter 36 then checks the years-used data 501 in FIG. 8, and inputs the result to the correlator count control unit 30.

The year count is then processed by the number of correlators determined by the assignment data in step ST31.

More specifically, the correlator count control unit 30 determines the number of correlators 34 to use based on the years-used data 501, which is the evaluation result from the year counter 36. The correlator count control unit 30 thus references the year count-related data 58*b* of the correlator assignment data 58 in FIG. 8. The years elapsed (years-of-use) is stored in relation to the maximum number of correlators 34 that are used together (FIG. 7) in the year count-related data 58*b* of the correlator assignment data 58.

Figure 18:
FIG. 18 shows an example of the reference data used by the correlation process count determination unit for determining the number of correlation processing units operated.

An example of this year count-related data 58*b* is shown in FIG. 18. The year count (years) is shown on the x-axis and the number of correlators used is shown on the y-axis, and the year count-related data 58*b* determines the number of correlators used based on the year count.

For example, if the service life of the device, particularly the power supply unit 25 (FIG. 2), is 10 years, the maximum number of correlators that can be used at one time is the full complement of available correlators, that is, movement correlators, because the likelihood of a system shutdown is low if the power supply is fully charged even if all of the correlators 34 (FIG. 7) are driven at the same time during the first three years of the service life (to year 3 from the first use). However, from three years to approximately six years from the first use, the number of correlators 34 that can be used at once is limited to m/2. From six years to approximately eight years, the number of correlators 34 that can be used at once is limited to m/4. From eight years to ten or more years, the maximum number of correlators 34 that can be used at once is limited to m/8.

As a result, in step ST31, the correlator count control unit 30 (FIG. 7) determines the maximum number of usable correlators 34 (FIG. 7) from the year count-related data 58*b* based on the years-used data 501, and determines how many correlators 34 to use.

The steps following step ST31 are identical to the steps of the first embodiment.

That is, after the correlation process in ST31, the steps from determining if the power supply voltage is greater than or equal to the threshold value in step ST11 to correcting the displayed time information in ST17, and steps ST18 and ST19, are the same as described in the first embodiment and further description thereof is omitted below.

The year counter 36 (see FIG. 7) is an example of a years-used counting unit. The GPS wristwatch 100 according to this second embodiment of the invention limits the number of correlators 34, which is an example of a correlation process unit having a plurality of correlators, that are used for operation based on the years of use counted by the year counter 36.

By thus limiting the number of operating correlation process units when the power supply capacity of the power supply unit 25 has decreased as a result of being used for many years, this aspect of the invention can limit the amount of power that is consumed by the reception unit. The GPS wristwatch 100 can therefore also be prevented from shutting down because of an insufficient power supply.

Embodiment 3

Figure 10:
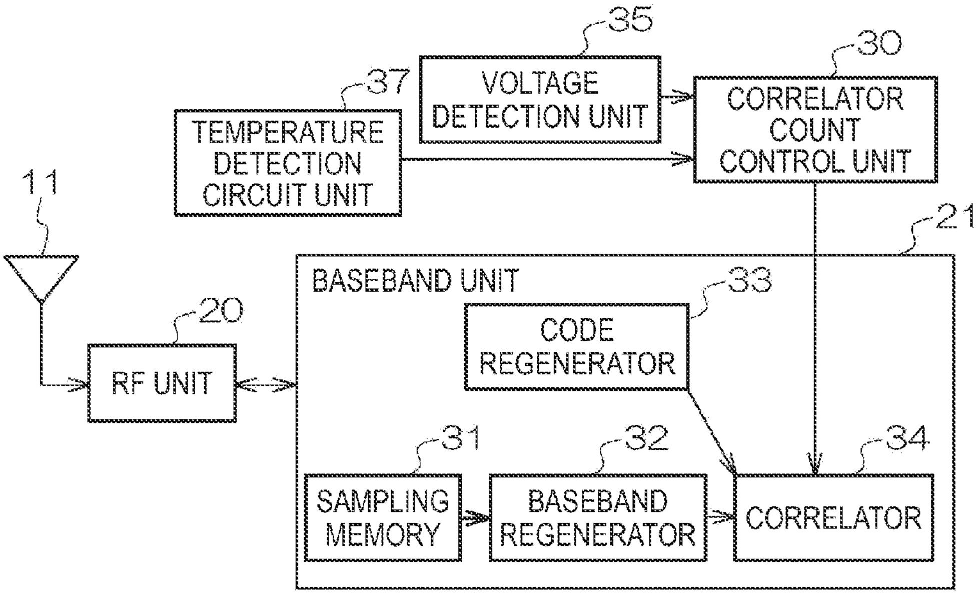
FIG. 10 is a schematic function block diagram of a wristwatch with GPS receiver according to a third embodiment of the invention.
Figure 11:
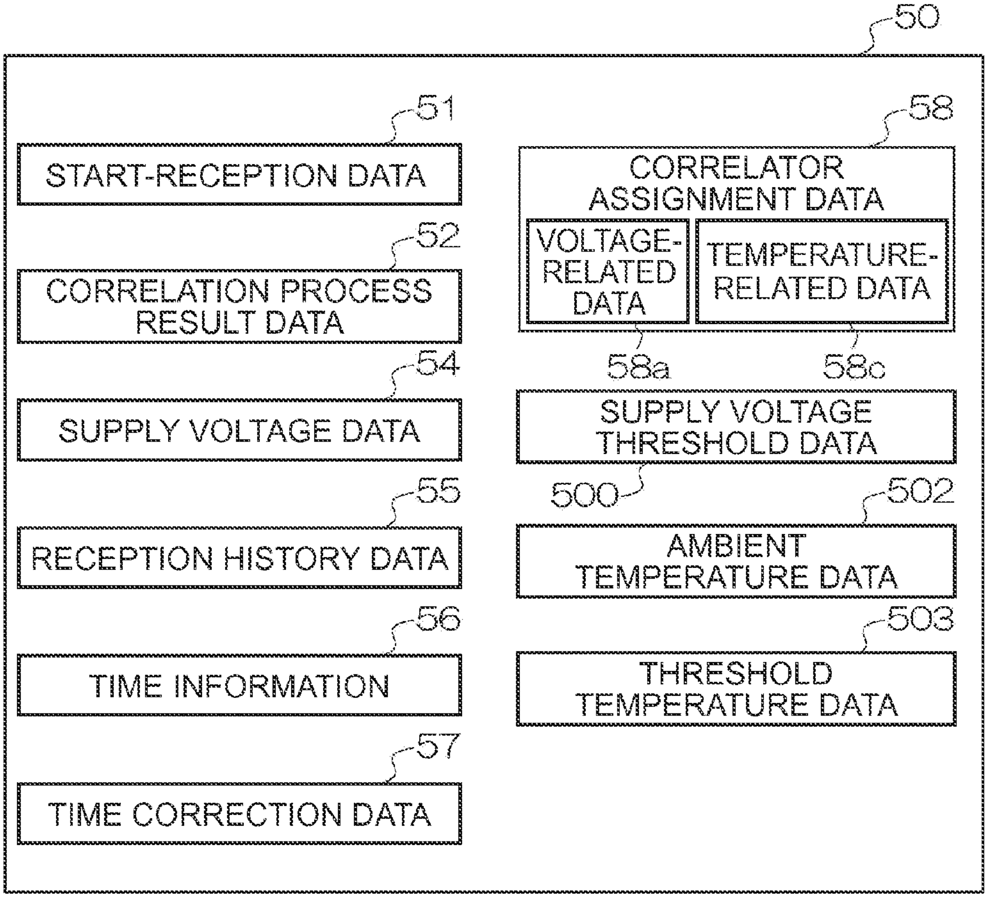
FIG. 11 is a block diagram showing the main data elements in a wristwatch with GPS receiver according to a third embodiment of the invention.
Figure 12:
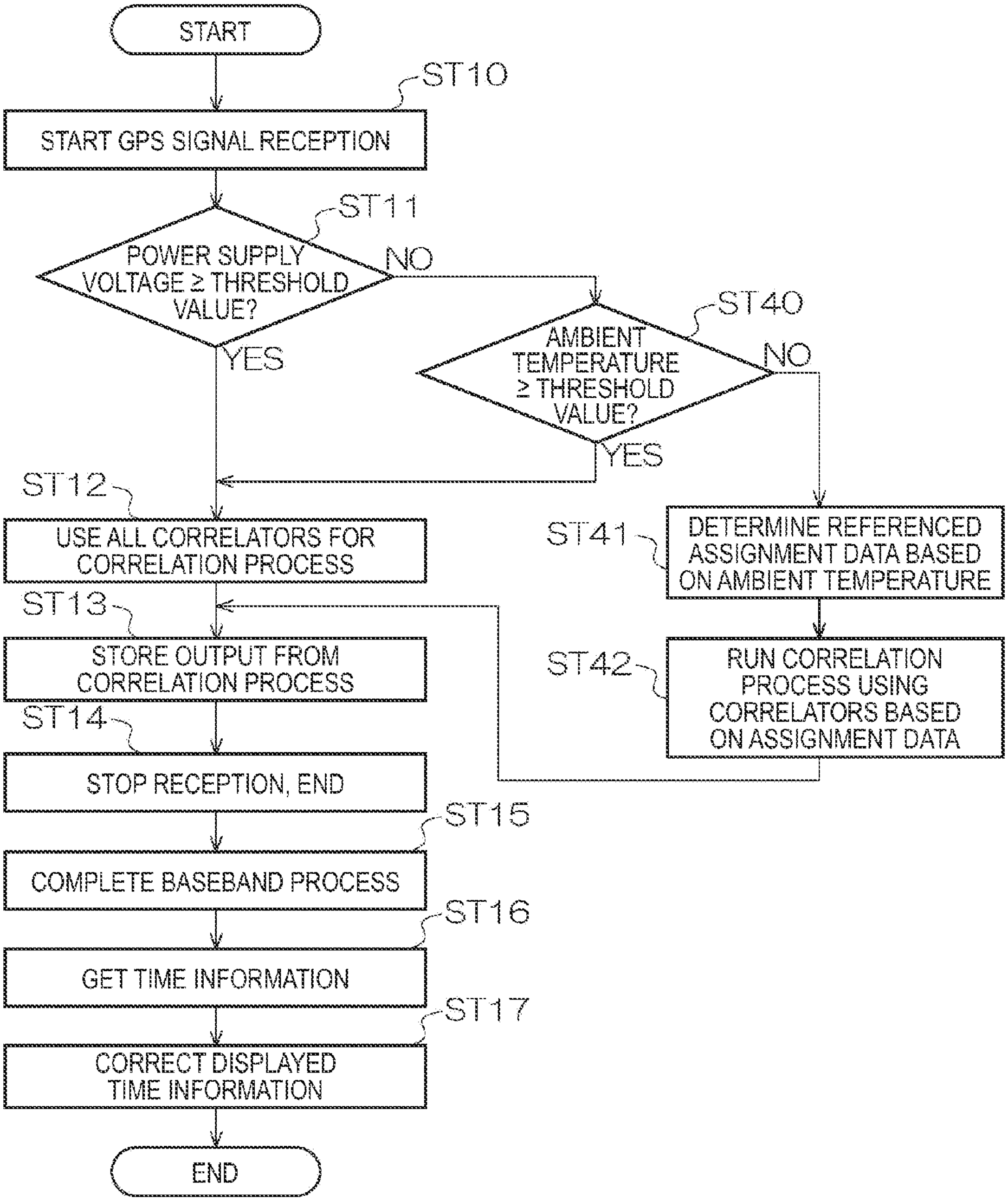
FIG. 12 is a flow chart showing the main steps in the operation of the wristwatch with GPS receiver according to the third embodiment of the invention.

FIGS. 10 and 11 a function block diagram and block diagram describing a GPS wristwatch 10*a* (see FIG. 1) according to a third embodiment of the invention. FIG. 12 is a flow chart describing the operation of the GPS wristwatch 10*a* according to this embodiment of the invention.

The arrangement of the GPS wristwatch 10*a* according to this embodiment of the invention is substantially identical to the GPS wristwatch 10 described in the first embodiment, like parts are identified by the same reference numerals, and the differences therebetween are described below.

This embodiment differs from the first embodiment in that the correlator count control unit 30 shown in FIG. 10 also has a temperature detection circuit unit 37 and also considers the result returned by the temperature detection circuit unit 37. As a result, the data storage unit 50 also stores ambient temperature data 502, threshold temperature data 503, and temperature-related data 58*c* as shown in FIG. 11. As shown in the flow chart in FIG. 12, there is also an extra step ST40 for confirming the ambient temperature after steps ST10 and ST11 if the power supply voltage is not greater than or equal to the threshold value.

Primarily these differences are described below.

In FIG. 12, receiving the GPS signal from the GPS satellite 15 starts in step ST10 based on the start-reception data 51 in FIG. 11 in the same way as described above in the first embodiment, and control then goes to step ST11. The step of determining if the power supply voltage is greater than or equal to the threshold value in step ST11 is the same as described in the first embodiment, and further description thereof is thus omitted here.

If the power supply voltage is not greater than or equal to the threshold value in step ST11, control goes to step ST40 to determine if the ambient temperature is greater than or equal to a threshold value.

That is, in step ST40 the temperature detection circuit unit 37 in FIG. 10 detects the temperature of the environment outside the GPS wristwatch 10*a*, and determines if this ambient temperature is greater than or equal to a threshold value.

More specifically, the temperature verification evaluation program of the temperature detection circuit unit 37 in FIG. 10 detects the ambient temperature outside the GPS wristwatch 10*a*, and stores the detected temperature as the ambient temperature data 502 in FIG. 11. The temperature verification evaluation program of the temperature detection circuit unit 37 in FIG. 10 then also determines if the ambient temperature data 502 is greater than or equal to the threshold temperature data 503 in FIG. 11.

The threshold temperature data 503 is also related to the performance of the battery or other device used as the power supply unit 25 (see FIG. 2) of the used device, and is set to 25° C. in this embodiment of the invention.

In general, batteries suffer from a relatively large voltage drop when the ambient temperature is low. Therefore, by detecting the ambient temperature and determining if the detected temperature is greater than or equal to a threshold value as in this embodiment of the invention, the usable peak power can be estimated. If the peak power is too low, the GPS wristwatch 10*a* or other device can then be prevented from shutting down.

If the ambient temperature is greater than or equal to the threshold value in step ST40, that is, if the temperature outside the GPS wristwatch 10*a* is greater than or equal to the threshold temperature data 503 in FIG. 11, control goes to step ST12. Step ST12 is as described above in the first embodiment, and further description is omitted here.

However, if the ambient temperature is not greater than or equal to the threshold temperature data 503 in step ST40, control goes to step ST41.

Step ST41 determines the assignment data that is referenced at the ambient temperature. More specifically, the correlator count control unit 30 in FIG. 10 determines the number of correlators 34 to be used based on the ambient temperature data 502 in FIG. 11 that is detected by the temperature detection circuit unit 37 and stored.

More specifically, the correlator count control unit 30 in FIG. 10 reads the temperature-related data 58*c* in the correlator assignment data 58 in FIG. 11. The temperature-related data 58*c* in the correlator assignment data 58 stores the relationship between ambient temperature and the maximum number of correlators 34 that can be operated at once.

Figure 19:
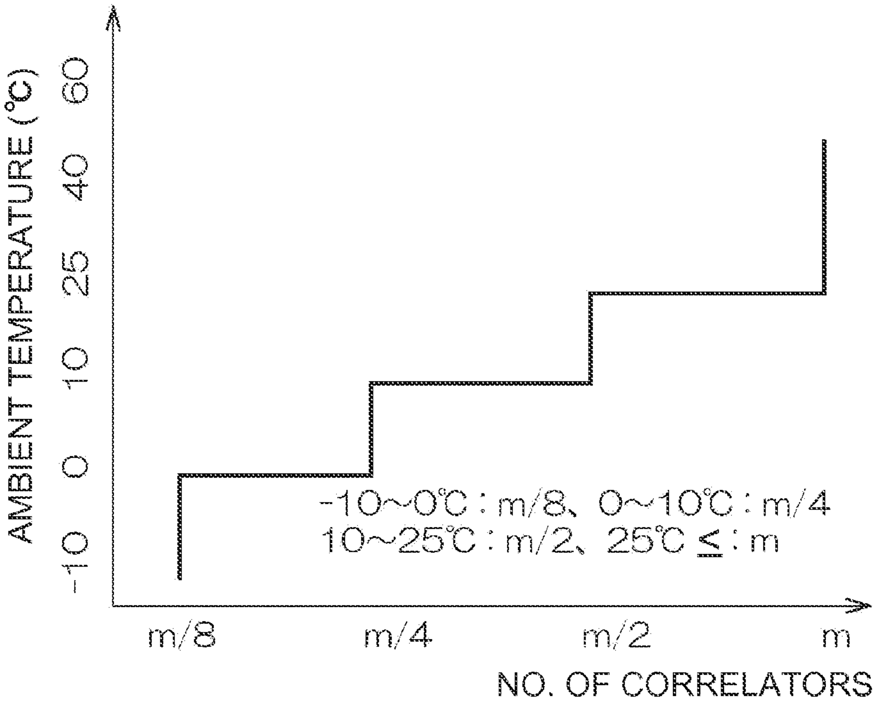
FIG. 19 shows an example of the reference data used by the correlation process count determination unit for determining the number of correlation processing units operated.

An example of the temperature-related data 58*c* is shown in FIG. 19. In FIG. 19 the ambient temperature (° C.) is on the y-axis and the usable number of correlators is on the x-axis. In this example the maximum number of usable correlators 34 is m/8 if the ambient temperature is in the range −10° C. to 0° C.

The maximum number is m/4 if the ambient temperature is 0° C. to 10° C., m/2 if 10° C. to 25° C., and m if the ambient temperature is greater than or equal to the threshold value temperature of 25° C. Note that as described above m is the maximum number of correlators 34 provided in the GPS wristwatch 10*a* or satellite signal reception device.

The number of correlators 34 (FIG. 10) can be changed in hardware or software.

The correlator count control unit 30 in FIG. 10 can therefore set the maximum number of usable correlators 34 by thus referencing the temperature-related data 58*c* in FIG. 11 based on the ambient temperature data 502 in FIG. 11.

In step ST42 the correlators 34 run the correlation process according to the assignment data. More specifically, because the number of correlators 34 in FIG. 10 that operate is determined from the temperature-related data 58*c* in FIG. 11 based on the ambient temperature data 502 in FIG. 11, the correlation process is run by this determined number of correlators 34.

As described above in the first embodiment of the invention, the correlation process is executed by the correlator adjustment program of the correlator count control unit 30 in FIG. 10 referencing the temperature-related data 58*c* of the correlator assignment data 58 in FIG. 11. In this example the number of correlators 34 that operate based on the temperature-related data 58*c* is m/8. Based on this temperature-related data 58*c*, the correlator count control unit 30 then causes m/8 correlators 34 in FIG. 10 to operate. The baseband unit 21 in FIG. 10 drives the m/8 correlators 34 to run the correlation process. By thus limiting the number of correlators 34 that operate at the same time, the peak power that is consumed can be suppressed.

Control then goes to step ST13. The steps from ST13 to ST17 are the same as described above in the first embodiment, and further description thereof is omitted here.

The temperature detection circuit unit 37 in FIG. 10 is an example of an environment evaluation unit and an example of a temperature detection unit. The correlator count control unit 30 in FIG. 10 is an example of a correlation process determination unit, and the correlators 34 in FIG. 10 are an example of a correlation process unit that has a plurality of correlators, that operate. The correlator count control unit 30 determines how many correlators 34 operate.

As a result, the number of operating correlators 34 (an example of a correlation process unit) that are used can thus be determined according to the operating environment of the GPS wristwatch 10*a* (an example of a timekeeping device with a satellite signal reception device).

Because the amount of power that can be supplied from the power supply unit 25 drops as the temperature of the ambient environment drops, how many correlators 34 (an example of a correlation process unit) are used is adjusted based on the temperature of the operating environment. The GPS wristwatch 10*a* (an example of a timekeeping device with a satellite signal reception device) can therefore be prevented from shutting down because of an insufficient power supply.

Embodiment 4

Figure 13:
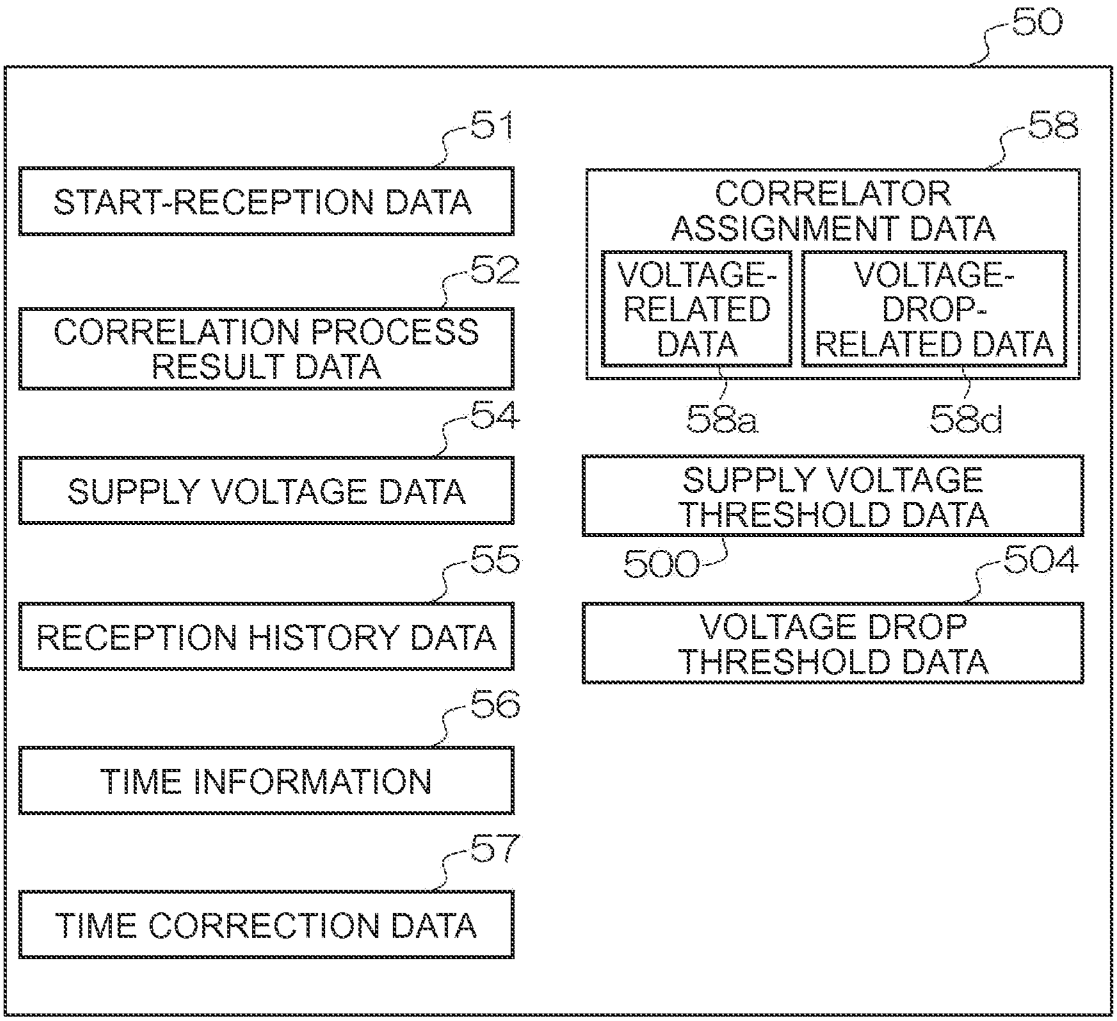
FIG. 13 is a block diagram showing the main data elements in a wristwatch with GPS receiver according to a fourth embodiment of the invention.
Figure 14:
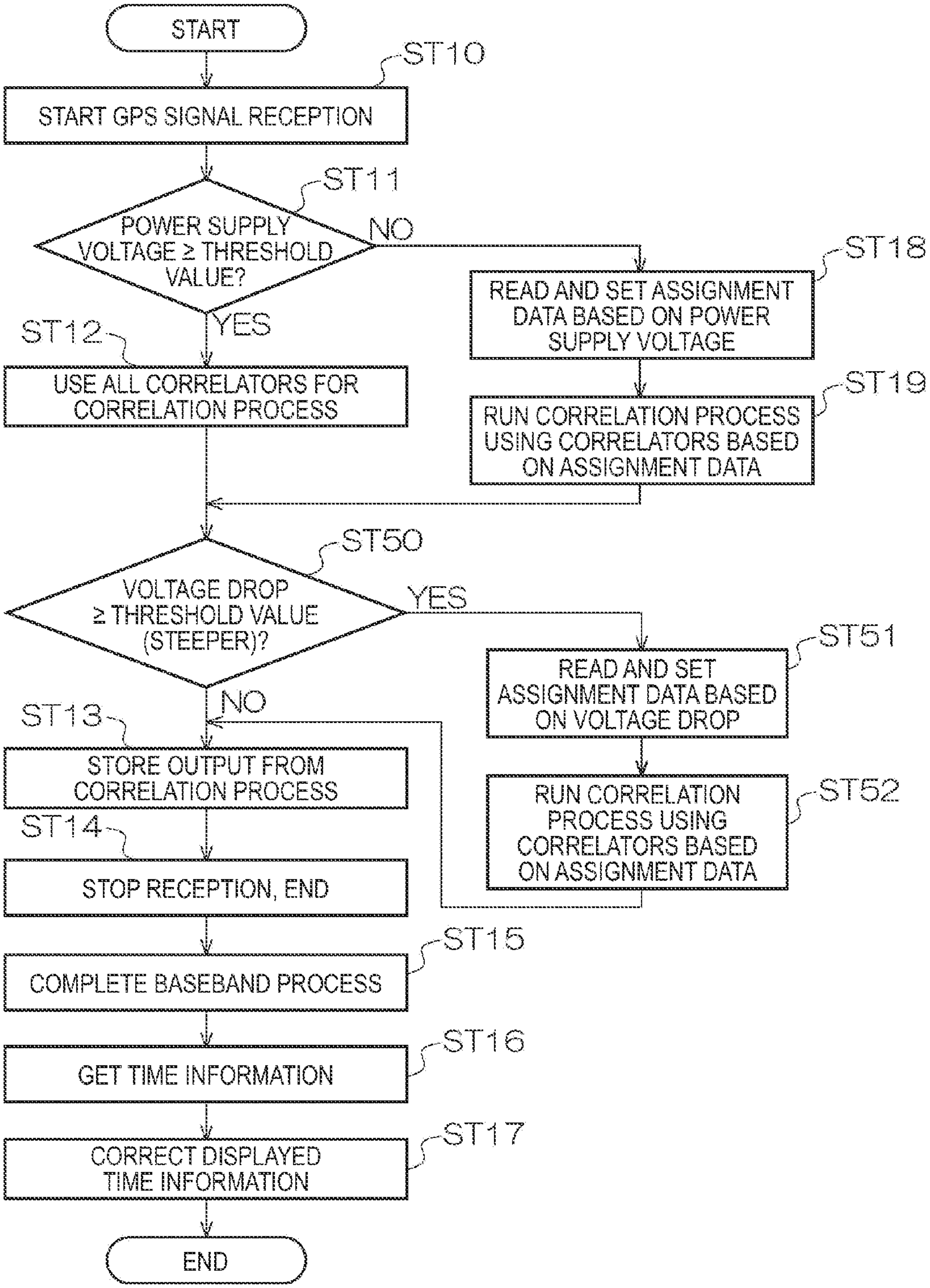
FIG. 14 is a flow chart showing the main steps in the operation of the wristwatch with GPS receiver according to the fourth embodiment of the invention.

FIG. 13 is a block diagram describing a GPS wristwatch 10*b* (see FIG. 1) according to a fourth embodiment of the invention. FIG. 14 is a flow chart describing the operation of the GPS wristwatch 10*b* according to this embodiment of the invention.

The function block diagram of the fourth embodiment is identical to FIG. 4 for the first embodiment, and differs in the addition of a function for detecting a voltage drop to the voltage detection unit 35 of the first embodiment. The voltage detection unit in this fourth embodiment is therefore referred to as voltage detection unit 305 below.

The arrangement of the GPS wristwatch 10*b* according to this embodiment of the invention is substantially identical to the GPS wristwatch 10 described in the first embodiment, like parts are identified by the same reference numerals, and the differences therebetween are described below.

This embodiment differs from the first embodiment in the addition of a function for detecting a voltage drop to the voltage detection unit 305 in FIG. 4. As a result, the data storage unit 50 shown in FIG. 13 additionally stores voltage-drop-related data 58*d* and voltage drop threshold data 504.

In addition, a step ST50 for checking the voltage drop is added between steps ST12 and ST13 in the flow chart in FIG. 14, and a step ST51 for adjusting the number of correlators 34 that operate based on the voltage drop. Other steps are identical to the first embodiment. In other words, if a voltage drop is detected and a sudden voltage drop is confirmed during the correlation process, the number of correlators 34 used is reduced in this third embodiment of the invention. Primarily these differences are described below.

In FIG. 14, receiving the GPS signal from the GPS satellite 15 starts in step ST10 based on the start-reception data 51 in FIG. 13 in the same way as described above in the first embodiment, and control then goes to step ST11 to determine if the power supply voltage is greater than or equal to the threshold value. If the power supply voltage is less than or equal to, the threshold value in ST11, control goes to steps ST18 and ST19. If the power supply voltage is greater than or equal to the threshold value in ST11, control goes to step ST12 and the correlation process is run by all of the correlators 34 (see FIG. 4). These steps are the same as described in the first embodiment, and further description thereof is thus omitted here.

Step ST50 follows step ST12. Step ST50 determines if the voltage drop of the power supply is greater than (steeper than) a threshold value.

More specifically, the voltage detection unit 305 in FIG. 4 detects the voltage drop per unit time in step ST50. Yet more specifically, the voltage drop threshold program of the voltage detection unit 305 in FIG. 4 detects the slope of the drop in the power supply voltage, and determines if this slope is greater than or equal to the voltage drop threshold data 504 in FIG. 13.

Figure 21:
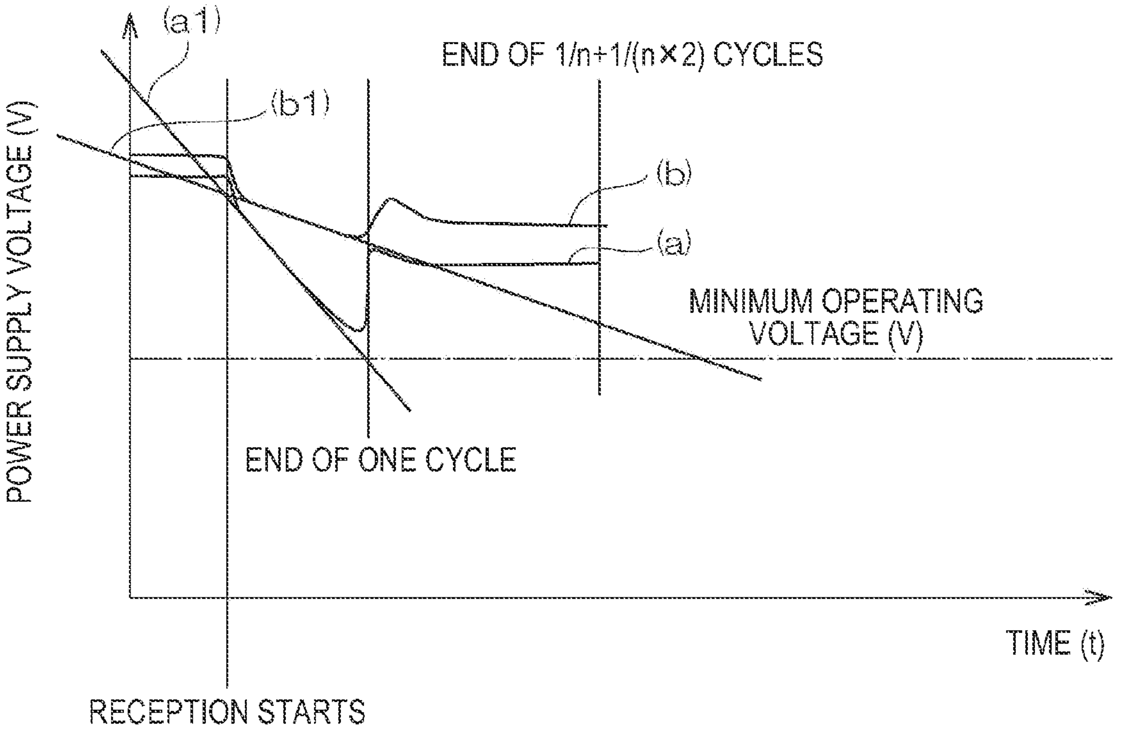
FIG. 21 is a graph showing the relationship between voltage drop (the gradient of the voltage drop) and time.

The voltage drop, or more specifically the slope of the voltage drop, is further described below with reference to FIG. 21. FIG. 21 shows the power supply voltage (V) on the y-axis and time (t) on the x-axis, and shows the drop in voltage over time from the start of satellite signal reception. Comparing the rate of the voltage drop from the start of reception to the end of one cycle indicated by line (a) in FIG. 21, and the rate of the voltage drop from the start of reception to the end of one cycle indicated by line (b) in FIG. 21, it is apparent that the voltage drop is greater in the case of FIG. 21(*a*).

More specifically, the slope (*a*1) denoting the rate of descent in line (*a*) in FIG. 21 is greater than the slope (*b*1) denoting the rate of descent in line (*b*) in FIG. 21, and shows that the voltage drop is greater in the case of line (*a*) than line (*b*).

Because the likelihood of a system shutdown is greater when there is a sudden voltage drop, an adjustment that prevents the slope denoting the voltage drop from exceeding a predetermined threshold value is preferable.

A threshold value such as 0.3 V is therefore stored in the voltage drop threshold data 504, and the voltage drop threshold program of the voltage detection unit 305 in FIG. 4 detects the slope of the drop in the power supply voltage in ST50 and determines if the slope is greater than the voltage drop threshold data 504.

If step ST50 determines that the slope is not greater than or equal to the threshold (steep), control goes to step ST13. Steps ST13 to ST17 are identical to the same steps in the first embodiment.

If step ST50 determines that the slope is greater than the threshold (steep), control goes to step ST51.

Step ST51 determines the slope data that is referenced by the detected voltage drop. More specifically, the correlator count control unit 30 determines how many correlators 34 are used based on the voltage drop (slope) detected by the voltage detection unit 305 in FIG. 4.

The voltage-drop-related data **58*d* in the correlator assignment data 58 in FIG. 13 is therefore read. The voltage-drop-related data 58*d* in the correlator assignment data 58 stores the relationship between the voltage drop (V) and the maximum number of correlators 34 (FIG. 4**) that can be used.

Figure 20:
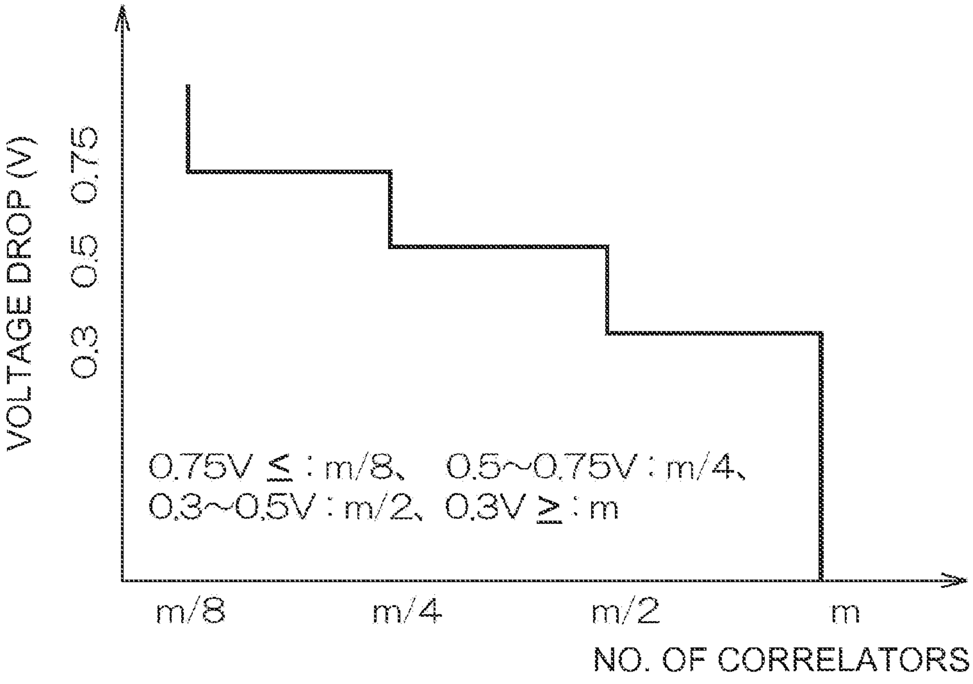
FIG. 20 shows an example of the reference data used by the correlation process count determination unit for determining the number of correlation processing units operated.

An example of this voltage-drop-related data **58*d* is illustrated in FIG. 20. In FIG. 20** the voltage drop (V) is on the y-axis and the usable number of correlators is on the x-axis.

In this example the maximum number of usable correlators 34 is m/8 if the voltage drop (V) is greater than or equal to 0.75 V. The maximum number is m/4 if the voltage drop is 0.5 to 0.75 V, m/2 if the voltage drop is 0.3 to 0.5 V, and m if the voltage drop is less than or equal to 0.3 V. Note that as described above m is the maximum number of correlators 34 provided in the GPS wristwatch **10*b*** or satellite signal reception device.

The number of correlators 34 (FIG. 4) can be changed in hardware or software.

In step ST51, the correlator count control unit 30 determines the maximum number of usable correlators 34 (see FIG. 4) from the voltage-drop-related data **58*d* (see FIG. 13**) based on the detected voltage drop.

Control then goes to step ST52 and the correlation process is run by the correlators based on the assignment data. More specifically, because the number of correlators 34 used is determined from the voltage-drop-related data **58*d* based on the voltage drop, the correlation process is run using this set number of correlators 34. The method of running the correlation process is as described in the first embodiment, that is, the correlator adjustment program of the correlator count control unit 30 in FIG. 4 references the voltage-drop-related data 58*d* of the correlator assignment data 58 in FIG. 13. The number of correlators 34 to be used is m/8 in this example. Next, the correlator count control unit 30 causes the m/8 correlators 34 to operate based on the voltage-drop-related data 58*d*. The baseband unit 21 in FIG. 4 then runs the correlation process using the m/8 correlators 34. By thus controlling the number of correlators 34** that are operated at one time, the peak power consumption can be reduced.

Control goes to step ST13. Steps ST13 to ST17 are the same as described above in the first embodiment, and further description is therefore omitted here.

The voltage drop, that is, the slope that is the rate of the voltage drop, is an example of amount-of-change information. This amount-of-change information is the change in power consumption over time from the start of receiving the satellite signal of the GPS satellite 15. When this voltage drop is relatively great, that is, when greater than the voltage drop threshold data 504, the correlator count control unit 30 (an example of correlation process count determination unit) determines the number of correlators 34 (an example of a correlation process unit having a plurality of correlators) that operate in order to reduce the voltage drop, which is amount-of-change information. It is therefore possible to prevent the GPS wristwatch **10*b***, which is an example of a satellite signal reception device, from shutting down because of a sudden decrease in the voltage of the power supply (also called the voltage drop).

The invention is not limited to the embodiments described above. The embodiments described above can be used alone or multiple embodiments can be used together. The invention has been described using a GPS satellite as an example of a positioning information satellite, but is not so limited and can be configured to receive signals from a geostationary satellite or quasi-zenith satellite.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A satellite signal reception device comprising:

a reception unit that receives satellite signals transmitted from a positioning information satellite;

a timekeeping unit that keeps time internally;

a power supply unit that supplies power at least to the reception unit;

a correlation process unit that is disposed in the reception unit and has a plurality of correlators for determining a correlation with the satellite signal when receiving satellite signals;

a power threshold value determination unit that determines if a power consumption value representing the consumption of power supplied from the power supply unit is greater than or equal to a threshold value; and a correlation process count determination unit that determines the number of correlators to use when the reception unit receives the satellite signal based on the result from the power threshold value determination unit so that power consumption when receiving the satellite signal decreases.

2. The satellite signal reception device described in claim 1, wherein:

when amount-of-change information, which represents change in power consumption over time from the start of satellite signal reception, is relatively high, the correlation process count determination unit determines the number of correlators used so that there is a relative decrease in the amount-of-change information.

3. The satellite signal reception device described in claim 1, further comprising:

a years-of-use counter unit that counts how many years the satellite signal reception device has been used;

wherein the correlation process count determination unit limits the number of correlators used based on the years-of-use count counted by the years-of-use counter unit.

4. The satellite signal reception device described in claim 1, further comprising:

an environment evaluation unit that evaluates the operating environment of the satellite signal reception device;

wherein the correlation process count determination unit determines the number of correlators used based on the result from the environment evaluation unit.

5. The satellite signal reception device described in claim 4, wherein the environment evaluation unit is a temperature detection unit that detects the temperature of the operating environment of the satellite signal reception device.

6. The satellite signal reception device described in claim 1, further comprising:

a time adjustment information storage unit that acquires at least satellite time information from the satellite signal and stores the acquired satellite time information as time adjustment information; and a time display unit that corrects and displays the internally kept time information based on the time adjustment information.

7. A timekeeping device with a satellite signal reception device comprising:

a reception unit that receives satellite signals transmitted from a positioning information satellite;

a timekeeping unit that keeps time internally;

a power supply unit that supplies power at least to the reception unit;

a correlation process unit that is disposed in the reception unit and has a plurality of correlators for determining a correlation with the satellite signal when receiving satellite signals;

a power threshold value determination unit that determines if a power consumption value representing the consumption of power supplied from the power supply unit is greater than or equal to a threshold value; and a correlation process count determination unit that determines the number of correlators to use when the reception unit receives the satellite signal based on the result from the power threshold value determination unit so that power consumption when receiving the satellite signal decreases.

8. A satellite signal reception method of a satellite signal reception device having a reception unit that receives satellite signals transmitted from a positioning information satellite, a power supply unit that supplies power at least to the reception unit, a correlation process unit that is disposed in the reception unit and has a plurality of correlators, and a correlation process count determination unit, the method comprising:

determining if a power consumption value representing the consumption of power supplied from the power supply unit is greater than or equal to a threshold value;

determining, using the correlation process count determination unit, the number of correlators to use when the reception unit receives the satellite based on the result of the power consumption value relative to the threshold value; and determining, using the correlation process unit, a correlation with the satellite signal using the number of correlators determined by the correlation process count determination unit.

* * * * *